United States Patent
Devarao et al.

(10) Patent No.: US 10,628,421 B2
(45) Date of Patent: Apr. 21, 2020

(54) MANAGING A SINGLE DATABASE MANAGEMENT SYSTEM

(71) Applicant: International Business Machines Corporation, Armonk, NY (US)

(72) Inventors: Praveen Devarao, Bangalore (IN); Ashok V. Jose, Bangalore (IN); Alok Mitra, Saidupur (IN); Smitha Pambalath, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 15/426,988

(22) Filed: Feb. 7, 2017

(65) Prior Publication Data

US 2018/0225314 A1  Aug. 9, 2018

(51) Int. Cl.
    *G06F 16/2455* (2019.01)
    *G06F 16/21* (2019.01)

(52) U.S. Cl.
    CPC ........ *G06F 16/2455* (2019.01); *G06F 16/212* (2019.01)

(58) Field of Classification Search
    CPC .................... G06F 16/212; G06F 16/2455
    See application file for complete search history.

(56) References Cited

U.S. PATENT DOCUMENTS

| | | | |
|---|---|---|---|
| 8,112,470 B2 * | 2/2012 | Ranney | G06F 16/289 709/201 |
| 8,869,063 B2 * | 10/2014 | O'Connor | G06Q 10/06 715/810 |
| 8,977,646 B2 | 3/2015 | Abrams et al. | |
| 9,330,147 B2 | 5/2016 | Tolbert | |
| 9,454,785 B1 * | 9/2016 | Hunter | G06F 16/285 |
| 9,477,697 B2 * | 10/2016 | Ortel | G06F 16/212 |
| 9,805,080 B2 * | 10/2017 | Joshi | G06F 3/04842 |
| 2007/0130206 A1 * | 6/2007 | Zhou | G16H 10/60 |
| 2014/0067866 A1 * | 3/2014 | Chen | H04L 69/06 707/791 |
| 2014/0181141 A1 * | 6/2014 | Sowell | G06F 16/245 707/769 |

(Continued)

FOREIGN PATENT DOCUMENTS

WO      2016018201 A1    2/2016

OTHER PUBLICATIONS

Codd; "A Relational Model of Data for Large Shared Data Banks"; IBM Research Laboratory; Jun. 1970. <https://www.seas.upenn.edu/~zives/03f/cis550/codd.pdf>.

*Primary Examiner* — Miranda Le
(74) *Attorney, Agent, or Firm* — Robert C. Bunker

(57) ABSTRACT

A method, computer system, and a computer program product for managing a single database management system (DBMS) which interfaces with both a first and second application program is provided. A first data set corresponding to a first data format may be received by a DBMS interface engine. A second data set corresponding to a second data format may be received by the DBMS interface engine. A holistic data model to represent the first data set and the second dataset may be determined by analyzing the first data set and the second data set using the DBMS interface engine. The holistic data model may be structured by the DBMS interface engine with respect to a single database of the single DBMS.

16 Claims, 14 Drawing Sheets

(56) References Cited

U.S. PATENT DOCUMENTS

| | | |
|---|---|---|
| 2015/0026189 A1 | 1/2015 | Li et al. |
| 2015/0039587 A1* | 2/2015 | Liu .................... G06F 16/8365 707/718 |
| 2015/0106078 A1* | 4/2015 | Chang .................... G06F 16/35 704/9 |
| 2016/0021198 A1 | 1/2016 | Liu et al. |
| 2016/0110505 A1 | 4/2016 | Symanski et al. |
| 2016/0124722 A1* | 5/2016 | Mathew .................... G06F 8/40 717/136 |
| 2017/0060973 A1* | 3/2017 | Liu ....................... G06F 16/282 |
| 2017/0060977 A1* | 3/2017 | Pan ....................... G06F 16/258 |

\* cited by examiner

800

900

```
{
  _id : 1234
  name : Praveen,
  location : India,
  dept : {
          code : D63,
          name: D&A
  },
  phone : { 9045345690,
            9877654321
          }
}
```

1100

MANAGING A SINGLE DATABASE MANAGEMENT SYSTEM

BACKGROUND

This disclosure relates generally to database management systems and, more particularly, relates to a method for managing a single database management system (DBMS) which interfaces with both a first application program that indicates a first data format and a second application program that indicates a second data format. Databases are used to store information for numerous types of applications. DBMSs are a typical mechanism for accessing data stored in a database. DBMSs often require tremendous resources to handle the heavy workloads placed on such systems. As such, it may be useful to increase the performance of database management systems.

SUMMARY

Aspects of the disclosure relate to managing a single database management system (DBMS) which interfaces with both a first application program that indicates a first data format and a second application program that indicates a second data format. The single DBMS may be configured to interpret and manage data holistically, regardless of type or format. The single DBMS may receive sets of data arranged according to one or more different formats from a plurality of separate application programs, and may model the received sets of data as one or more graph constructs. Queries may be received and processed by the single DBMS to provide valid result sets in the same format as the query. Natural language processing, text analytics, and image processing techniques may be applied to examine unstructured data and arrange the information such that the associated data may be searchable and interfaced with as structured data.

Disclosed aspects relate to managing a single database management system (DBMS) which interfaces with both a first and second application program. A first data set corresponding to a first data format may be received by a DBMS interface engine. A second data set corresponding to a second data format may be received by the DBMS interface engine. A holistic data model to represent the first data set and the second data set may be determined by analyzing the first data set and the second data set using the DBMS interface engine. The holistic data model may be structured by the DBMS interface engine with respect to a single database of the single DBMS.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
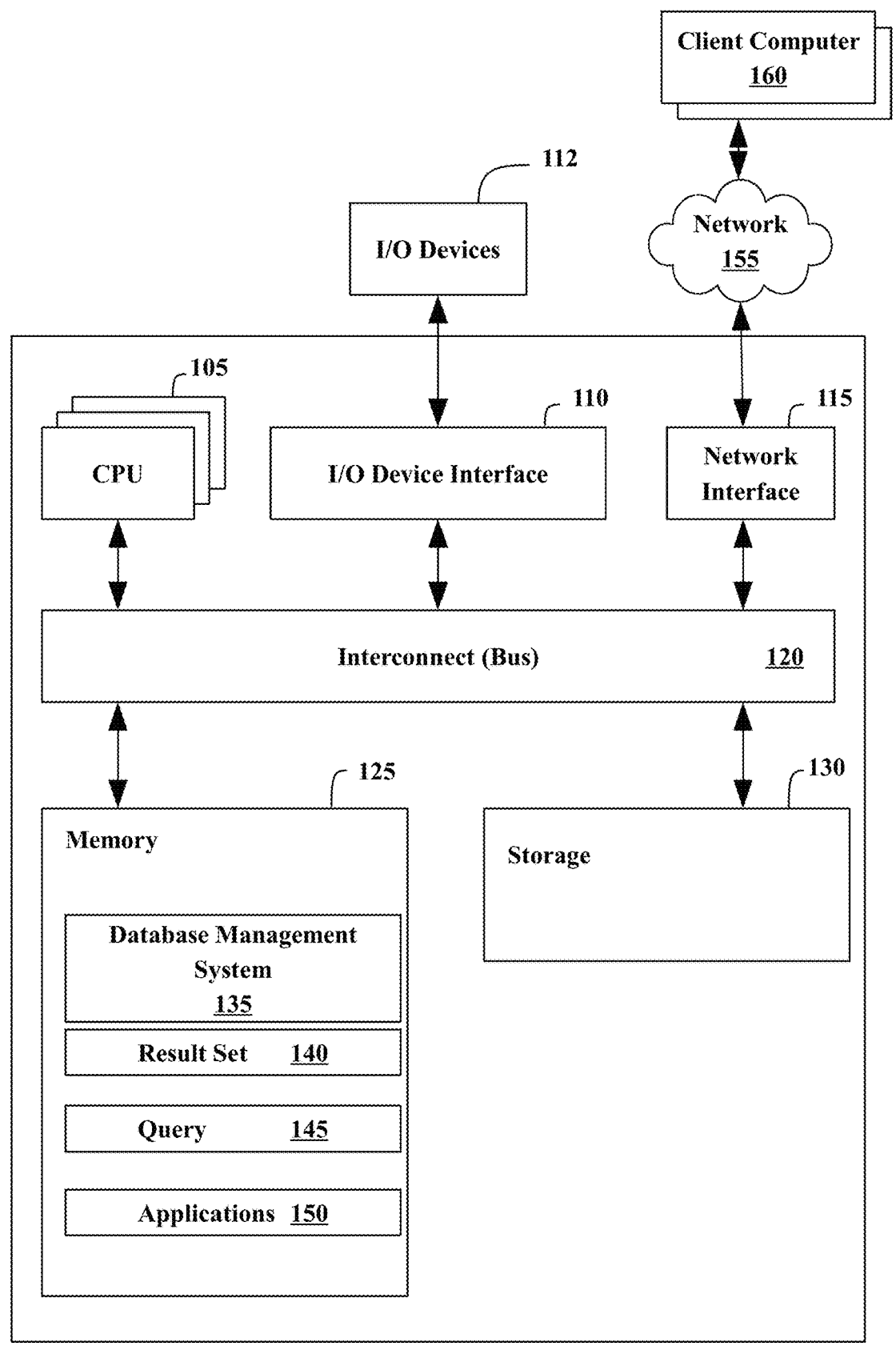
FIG. 1 illustrates an example representation of a computer system connected to a client computer via a network according to an embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to managing a single database management system (DBMS) which interfaces with both a first application program that indicates a first data format and a second application program that indicates a second data format. The single DBMS may be configured to interpret and manage data holistically, regardless of type or format. The single DBMS may receive sets of data arranged according to one or more different formats (e.g., key-value format, JSON format, relational format, graph format, unstructured data) from a plurality of separate application programs, and may model the received sets of data as one or more graph constructs (e.g., a series of related vertexes and edges, where each vertex and edge may have properties that indicate the attributes of corresponding data). Queries may be received and processed by the single DBMS to provide valid result sets in the same format as the query.

Natural language processing, text analytics, and image processing techniques may be applied to examine unstructured data (e.g., images, emails) and arrange the information such that the associated data may be searchable and interfaced with as structured data. Leveraging a single database management system for handling data regardless of format may be associated with benefits such as flexibility, query processing, and database management efficiency.

Data may be stored and modeled in one or more of a number of formats to facilitate organization and use by different systems, users, or applications. For instance, data may be stored in various formats such as graph, JSON (JavaScript Object Nation), relational, or the like. Aspects of the disclosure relate to the recognition that, in some situations, applications may not be configured to interact with particular data formats, posing challenges with respect to data access, search, and discovery. Accordingly, aspects of the disclosure relate to a single database system configured to understand and interact with data holistically regardless of data format. As an example, an application that interacts with data in a JSON format may interface with the single database in a JSON mode and search the single database using JSON queries, whereas an application that uses a strict ACID (Atomicity, Consistency, Isolation, Durability) compliant SQL (Structured Query Language) based system may interact with the database in an SQL mode. As such, data may be stored and modeled in the single database using one or more graph constructs that are independent of the data format in which the data was received. Queries, inserts, updates, deletes, and other database operations may be performed in the native data format of the interfacing application. In this way, flexibility, ease of access, and database efficiency may be facilitated with respect to data stored in the single database.

Aspects of the disclosure include a method, system, and computer program product for managing a single database management system (DBMS) which interfaces with both a first application program that indicates a first data format and a second application program that indicates a second data format. A first data set corresponding to the first data format may be received by a DBMS interface engine from the first application program. A second data set corresponding to the second data format may be received by the DBMS interface engine from the second application program. The first data format may differ from the second data format. A holistic data model to represent the first data set and the second data set may be determined by analyzing the first data set and the second data set using the DBMS interface engine. The holistic data model may include a first data construct based on the first data set and second data construct based on the second data set. The holistic data model may be structured by the DBMS interface engine with respect to a single database of the single DBMS.

In embodiments, a first query may be received by a DBMS interface engine. The first query may indicate the first data format. A second query may be received by the DBMS interface engine. The second query may indicate the second data format, wherein the first data format differs from the second data format. A single database of the single DBMS may be searched based on the first query. The single database of the single DBMS may be searched based on the second query. A first valid search result for the first query may be resolved. A second valid search result for the second query may be resolved. The first valid search result may be provided by the DBMS interface engine. The second valid search result may be provided by the DBMS interface engine. Altogether, aspects of the disclosure may provide performance or efficiency benefits for query processing management in a database management system. Aspects may save resources such as bandwidth, processing, or memory.

FIG. 1 illustrates an example representation of a computer system 100 connected to one or more client computers 160 via a network 155, according to some embodiments. For the purposes of this disclosure, computer system 100 may represent practically any type of computer, computer system, or other programmable electronic device, including but not limited to, a client computer, a server computer, a portable computer, a handheld computer, an embedded controller, etc. In some embodiments, computer system 100 may be implemented using one or more networked computers, e.g., in a cluster or other distributed computing system.

The computer system 100 may include, without limitation, one or more processors (CPUs) 105, a network interface 115, an interconnect 120, a memory 125, and a storage 130. The computer system 100 may also include an I/O device interface 110 used to connect I/O devices 112, e.g., keyboard, display, and mouse devices, to the computer system 100.

Each processor 105 may retrieve and execute programming instructions stored in the memory 125 or storage 130. Similarly, the processor 105 may store and retrieve application data residing in the memory 125. The interconnect 120 may transmit programming instructions and application data between each processor 105, I/O device interface 110, network interface 115, memory 125, and storage 130. The interconnect 120 may be one or more busses. The processor 105 may be a single central processing unit (CPU), multiple CPUs, or a single CPU having multiple processing cores in various embodiments. In one embodiment, a processor 105 may be a digital signal processor (DSP).

The memory 125 may be representative of a random access memory, e.g., Static Random Access Memory (SRAM), Dynamic Random Access Memory (DRAM), read-only memory, or flash memory. The storage 130 may be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 115 may be configured to transmit data via the communications network 155.

The memory 125 may include a database management system (DBMS) 135, a result set 140, a query 145, and applications 150. Although these elements are illustrated as residing in the memory 125, any of the elements, or combinations thereof, may reside in the storage 130 or partially in the memory 125 and partially in the storage 130. Each of these elements will be described in greater detail in accordance with FIG. 2.

The network 155 may be any suitable network or combination of networks and may support any appropriate protocol suitable for communication of data and/or code to/from the server computer system 100 and the client computer system 160. In some embodiments, the network 155 may support wireless communications. In other embodiments, the network 155 may support hardwired communications. The network 155 may be the Internet and may support Internet Protocol in some embodiments. In other embodiments, the network 155 may be implemented as a local area network (LAN) or a wide area network (WAN). The network 155 may also be implemented as a cellular data network. Although the network 155 is shown as a single network in the figures, one or more networks of the same or different types may be included.

The client computer system 160 may include some or all of the hardware and software elements of the computer system 100 previously described. As shown, there may be one or more client computers 160 connected to the computer system 100 via the network 155. In some embodiments, one or more client computers 160 may send a query 145 by network 155 to computer system 100 and receive a result set 140.

Figure 2:
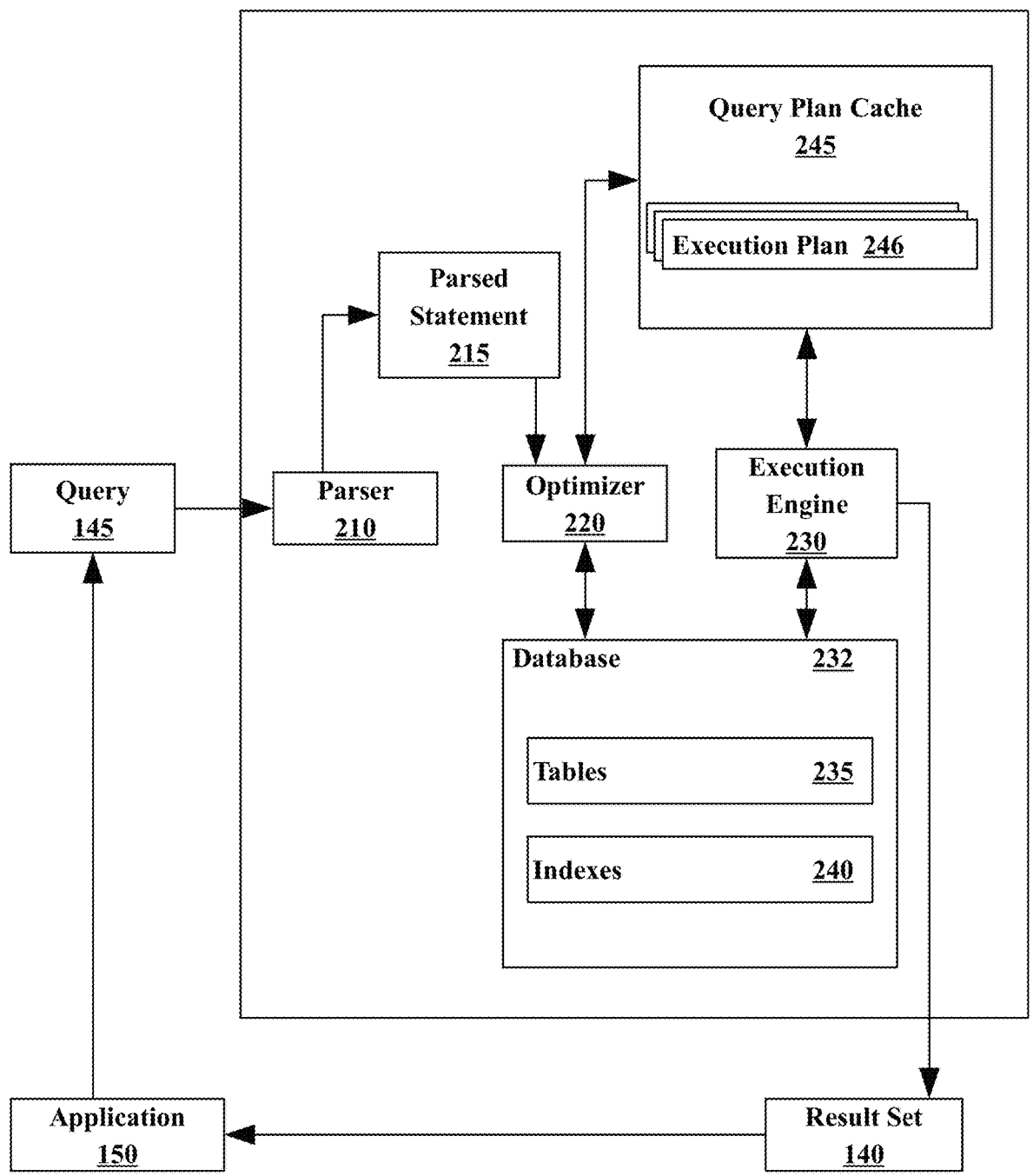
FIG. 2 illustrates an example database management system (DBMS) according to an embodiment.

FIG. 2 illustrates an example database management system (DBMS) 135. The DBMS 135 may include a parser 210, an optimizer 220, an execution engine 230, and a database 232. The parser 210 may receive a database query 145 from an application 150. In some embodiments, the database query 145 may be in the form of a Structured Query Language (SQL) statement. The parser 210 may generate a parsed statement 215. The parser 210 may send the parsed statement 215 to an optimizer 220. The optimizer 220 may attempt to optimize the parsed statement. In some embodiments, optimizing may improve the performance of the database query 145 by, for example, reducing the amount of time it takes to provide a user with a response. The optimizer 220 may generate an execution plan 246 (access plan), which may be maintained in a query plan cache 245, according to some embodiments. The query plan cache 245 may include one or more execution plans 246, including the current execution plan as well as previously used execution plans. Once an execution plan 246 is generated, the execution plan 246 may be sent to the execution engine 230. The execution engine 230 may execute the query 145. Executing the query 145 may include finding and retrieving data in the database tables 235 that satisfies the criteria supplied in the query 145. The execution engine 230 may store the data returned matching the query 145 in a result set 140. The DBMS 135 may return the result set 140 to an application 150, such as the application in which the database query 145 was generated, as a response to the database query 145.

A database 232 may include one or more tables 235 and, in some embodiments, one or more indexes 240. A database table 235 may organize data into rows and columns. Each row of a database table 235 may correspond to an individual entry, a tuple, or a record in the database 232. A column may define what is stored in each entry, tuple, or record. In some embodiments, columns of a table 235 may also be referred to as fields or attributes. Each table 235 within the database 232 may have a unique name. Each column within a table 235 may also have a unique name. A row, tuple, or record, however, within a particular table 235 may not be unique, according to some embodiments. A database 232 may also include one or more indexes 240. An index 240 may be a data structure that may inform the DBMS 135 of the location of a particular record within a table 235 if given a particular indexed column value. In some embodiments, the execution engine 230 may use the one or more indexes 240 to locate data within a table 235. In other embodiments, the execution engine 230 may scan the tables 235 without using an index 240.

As mentioned herein, the optimizer 220 creates the query access plan. The optimizer 220 may be implemented as computer program instructions that optimize the access plan in dependence upon database management statistics. Database statistics may reveal, for example, that there are only two identification values in a transactions table—so that it is an optimization, that is, more efficient, to scan the transactions table rather than using an index. Alternatively, database statistics may reveal that there are many transaction records with only a few transaction records for each identification value—so that it is an optimization, that is, more efficient, to access the transaction records by an index.

Figure 3:
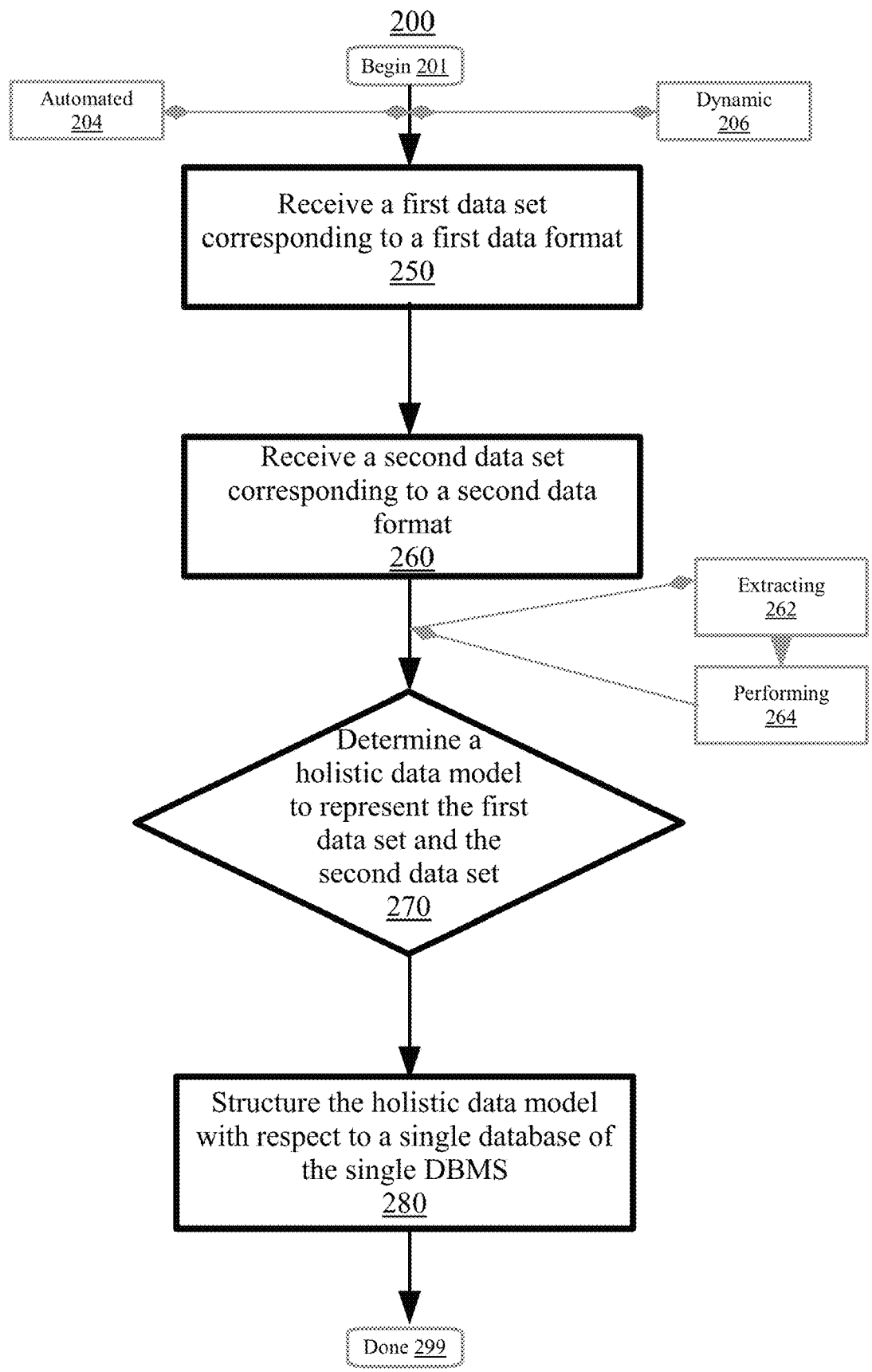
FIG. 3 is a flowchart illustrating a method for managing a single DBMS which interfaces with both a first application program that indicates a first data format and a second application program that indicates a second data format, according to embodiments.

FIG. 3 is a flowchart illustrating a method 200 for managing a single DBMS which interfaces with both a first application program that indicates a first data format and a second application program that indicates a second data format. Aspects of method 200 relate to determining and structuring a holistic data model to represent data sets in a single database of the single DBMS. The single database may include a collection of data records, files, indices, arrays, views, tables, rows, columns, and other data structures for data management and organization. The single database may be used to aggregate data and information in a single repository regardless of data format (e.g., rather than separate databases for data of different data formats). The single DBMS may include a software or hardware module configured to upkeep and maintain the single database. The single DBMS may be used to interface with application programs in a variety of different data formats The holistic data model may be used to represent data sets corresponding to different data formats to facilitate interoperability and flexibility of the data sets. Aspects of the disclosure relate to the recognition that in some situations, applications may not be configured to interact with particular data formats, posing challenges with respect to data access, search, and discovery. Accordingly, aspects of the disclosure relate to a single database system configured to understand and interact with data holistically regardless of data format. Altogether, leveraging a single database management system for handling data regardless of format may be associated with benefits such as flexibility, query processing, and database management efficiency. The method 200 may begin at block 201.

In embodiments, each of the set of operational steps may be executed in an automated fashion at block 204. The steps described herein may be executed in an automatic fashion without user intervention. In embodiments, the receiving, the receiving, the determining, the structuring, and the other steps described herein may be carried out by an internal DBMS management module maintained in a persistent storage device of a local computing device (e.g., network node). In embodiments, the receiving, the receiving, the determining, the structuring, and the other steps described herein may be carried out by an external DBMS management module hosted by a remote computing device or server (e.g., server accessible via a subscription, usage-based, or other service model). In this way, aspects of managing a single DBMS system may be performed using automated computing machinery without manual action. Other methods of performing the steps described herein are also possible.

In embodiments, each of the set of operational steps may be executed in a dynamic fashion at block 206. The receiving, the receiving, the determining, the structuring, and the other steps described herein may each be executed in a dynamic fashion to streamline management of the single DBMS system. For instance, the receiving, the receiving, the determining, the structuring, and the other steps described herein may occur in real-time, ongoing, or on-the-fly. As an example, one or more steps described herein may be performed on-the-fly (e.g., the holistic data model may be determined and structured dynamically in response to reception of the first and second data sets) in order to streamline (e.g., facilitate, promote, enhance) management of the single DBMS. Other methods of performing the steps described herein are also possible.

At block 250, a first data set corresponding to a first data format may be received. The first data set may be received by a DBMS interface engine from a first application program. Generally, receiving can include detecting, collecting, sensing, discovering, recognizing, obtaining, or otherwise accepting delivery of the first data set corresponding to the first data format. The first data set may include a collection of structured or unstructured information configured to be managed by the single database management system. In embodiments, the first data set may correspond to a first data format. The first data format may include a pre-determined standard that defines the arrangement, composition, or organization of a set of data. The first data format may define the structure (e.g., how data is organized) as well as the encoding (e.g., how bits are used to encode information in a digital storage medium) for the set of data. As an example, the first data set may correspond to a first data format of "JSON." In embodiments, the first data set may be received by a DBMS interface engine from a first application program. The DBMS interface engine may include a software module or hardware component configured to maintain, curate, update, organize, or otherwise manage the single database. The first application program may include a computer program, collection of computer instructions configured for a specific purpose, or other type of software. In embodiments, receiving may include detecting a first data set to be stored by the single DBMS. In certain embodiments, the first data set may be structured according to the first data format. As an example, a DBMS interface engine may receive a first data set including a list of names, identification numbers, departments, and ages of a number of employees that is structured according to a relational format. Other methods of receiving the first data set corresponding to the first data format are also possible.

At block 260, a second data set corresponding to a second data format may be received. The second data set may be received by the DBMS interface engine from a second application program. Generally, receiving can include detecting, collecting, sensing, discovering, recognizing, obtaining, or otherwise accepting delivery of the second data set corresponding to the second data format. As described herein, the second data set may include a collection of structured or unstructured information configured to be managed by the single database management system. The second data set may be received from a second application program (e.g., computer program, collection of computer instructions configured for a specific purpose, or other type of software). In certain embodiments, the second application program may be configured to handle or interface with data in a data format different than the first application program (e.g., the second data format rather than the first data format). In embodiments, the second data set may correspond to a second data format that is different that the first data format. As an example, in certain embodiments, the first data set may correspond to a relational format and the second data set may correspond to a graph format. In embodiments, receiving may include accepting a transmission of the second data set from the second application program to store the second data set in the single database. As an example, the DBMS interface engine may receive an index of product names, prices, and serial numbers that is structured according to an SQL (e.g., relational) format. In embodiments, the second data set and the first data format may be received simultaneously (e.g., at the same time, within a predetermined time interval). Other methods of receiving the second data set corresponding to the second data format are also possible.

In embodiments, a format-specific data attribute may be extracted at block 262. The format-specific data attribute may be extracted with respect to the first data set corresponding to the first data format. Aspects of the disclosure relate to the recognition that, in some situations, different data formats may have distinctive characteristics (e.g., intricacies) that affect how data structured according to that format may be interpreted or handled. Accordingly, aspects of the disclosure relate to extracting one or more format-specific data attributes of the first data set to facilitate accurate and flexible representation of the first data set in the single DBMS. Generally, extracting can include detecting, identifying, extricating, identifying, or otherwise ascertaining the format-specific data attribute with respect to the first data set. The format-specific data attribute may include a property, characteristic, feature, or aspect of the first data set that is particular to a specific data format. As an example, the format-specific data attribute may include a relationship between an embedded field and a main document of a JSON-formatted first data set. In embodiments, extracting the format-specific data attribute may include analyzing the first data set using one or more content analysis techniques to examine the format, encoding, data structure, and metadata pertaining to the first data set to ascertain elements of the first data set that may impact how the first data set may be modeled in the single DBMS. Consider the following example. The DBMS interface engine may be configured to analyze a JSON-formatted first data set, and extract a format-specific data attribute that indicates that an embedded field of the first data set is related to a main document via a foreign key query. Other methods of extracting the format-specific data attribute with respect to the first data set are also possible.

In embodiments, a data management action to configure the first data set for use in the holistic data model may be performed at block 264. The data management action may be performed based on the format-specific data attribute with respect to the first data set. Generally, performing can include implementing, carrying-out, accomplishing, completing, instantiating, or otherwise executing the data management action. The data management action may include a process, procedure, activity, or other operation to configure the first data set for use in the holistic data model. As examples, the data management action may include an operation to format, prepare, organize, arrange, normalize, encode, decode, or layout the first data set in a form consistent with that of the holistic data model. For instance, performing the data management action may include deriving a first data construct (e.g., graph-based data structure to organize the first data set) to represent the first data set in the holistic data model. Consider the following example. With respect to the previous example in which a format-specific data attribute indicating that an embedded field of the first data set is related to a main document via a foreign key query is extracted from JSON-formatted first data set, performing the data management action may include inserting the embedded document in a corresponding dependent data table of the single database. As another example, for a first data set that includes a JSON-formatted query, a format-specific data attribute including foreign key-related data may be extracted and provided as an embedded field. Other methods of performing the data management action to configure the first data set for use in the holistic data model are also possible.

At block 270, a holistic data model to represent the first data set and the second data set may be determined. The holistic data model may include a first data construct based on the first data set and a second data construct based on the second data set. The holistic data model may be determined by analyzing the first data set and the second data set using the DBMS interface engine. Generally, determining can include computing, formulating, calculating, deriving, developing, generating, creating, or otherwise ascertaining the holistic data model. The holistic data model may include a data structure to organize elements of data and their relationships to one another. The holistic data model may be configured to ingest and interpret data structured according to one or more different data formats, and represent it as a series of data constructs within a single database of the single DBMS. The data constructs may include graph-based data structures in which data objects (e.g., entities) are expressed as vertices, and relations between vertices are represented by edges. Each vertex and edge may have one or more properties that indicate the attributes of each respective data object. The holistic data model may be configured to interface with (e.g., be searched by, modified by) one or more application programs (e.g., the first application program and the second application program) in their native data formats. For instance, queries to the holistic data model may be resolved with result data sets formatted in the same format as the original query. In embodiments, determining the holistic data model may include analyzing (e.g., investigating, examining, evaluating, scrutinizing, assessing) the first data set and the second data set to ascertain the data format, encoding, data structure/organizational relationships for the first data set and the second data set respectively, and subsequently applying a set of arrangement rules that define how the first and second data sets may be represented as data constructs within the holistic data structure. For instance, the set of arrangement rules may specify how data sets corresponding to key-value formats, JSON formats, relational formats, graph formats, unstructured data and other formats may be represented as data constructs. Accordingly, in embodiments, determining the holistic data model may include identifying a subset of the set of arrangement rules that correspond to the data format, encoding, data structure/organizational relationships for the first data set and the second data set, and ascertaining one or more data structures to represent the first and second data structures within the holistic data structure. Other methods of determining the holistic data model to represent the first data set and the second data set are also possible.

At block 280, the holistic data model may be structured by the DBMS interface engine. The holistic data model may be structured with respect to a single database of the single DBMS. Generally, structuring can include arranging, building, organizing, constructing, forming, creating, generating, or otherwise establishing the holistic data model by the DBMS interface engine. In embodiments, structuring may include assembling the holistic data model by generating a first data construct to represent the first data set and a second data construct to represent the second data set based on the set of arrangement rules. As an example, consider a first data set that corresponds to a key-value format and a second data set that corresponds to a relational format. As described herein, a set of arrangement rules may be identified and applied to both the first data set and the second data set to ascertain how the first data set and the second data set may be represented as data constructs within the holistic data model. In embodiments, the set of arrangement rules may indicate that for data in a key-value format, the edges of data constructs are to be named against particular key values (e.g., keys may include integers or strings), and that for data in a relational format, the relation between different spaces (e.g., special head node) are to be represented via edges that span between spaces. Accordingly, based on the set of arrangement rules, the DBMS interface engine may generate a first data construct for the first data set and a second data construct for the second data set to structure the holistic data model. Other methods of structuring the holistic data model are also possible.

Method 200 concludes at block 299. As described herein, aspects of method 200 relate to managing a single DBMS. Aspects of method 300 may provide performance or efficiency benefits related to managing a single DBMS. As an example, maintaining data in a holistic data model irrespective of data format may allow for application programs to interface with the single database in their native data formats, facilitating data flexibility and interoperability between application programs. Altogether, leveraging a single database management system for handling data regardless of format may be associated with benefits such as flexibility, query processing, and database management efficiency. Aspects may save resources such as bandwidth, processing, or memory.

Figure 4:
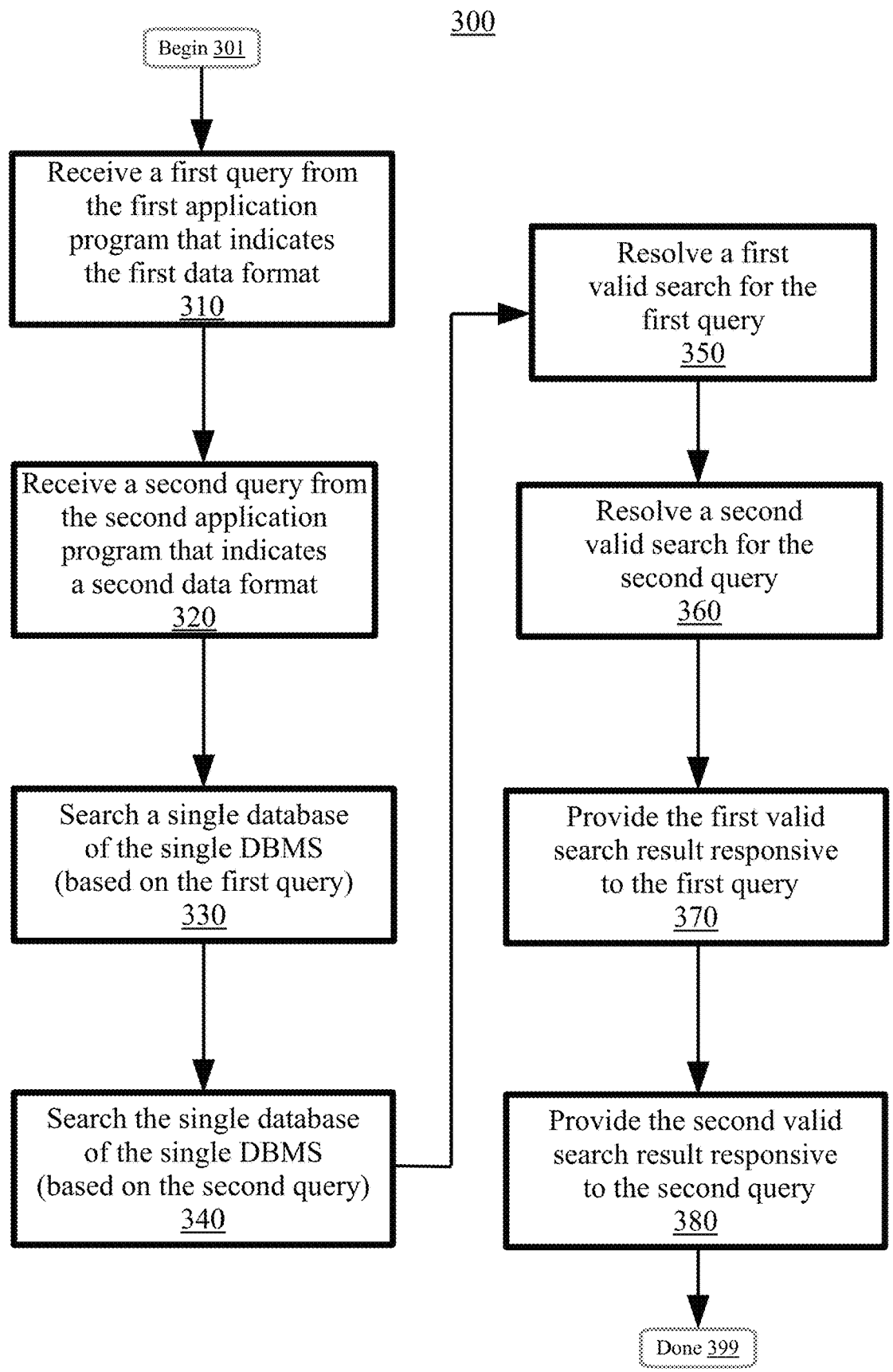
FIG. 4 is a flowchart illustrating a method for managing a single DBMS which interfaces with both a first application program that indicates a first data format and a second application program that indicates a second data format, according to embodiments.

FIG. 4 is a flowchart illustrating a method 300 for managing a single DBMS which interfaces with both a first application program that indicates a first data format and a second application program that indicates a second data format. Aspects of method 300 relate to providing valid result sets to resolve queries for data received by the single DBMS. As described herein, aspects of the disclosure relate to a single DBMS having a holistic data model that is configured to manage queries regardless of data format. The single DBMS may be configured to interface with application programs in their native format, and provide valid results that are formatted in the same data format as the original query. Altogether, leveraging a single database management system for handling data regardless of format may be associated with benefits such as flexibility, query processing, and database management efficiency. The method 300 may begin at block 301.

At block 310, a first query may be received. The receiving may be performed by a DBMS interface engine. The first query may be received from a first application program that indicates the first data format. Generally, receiving can include detecting, collecting, sensing, discovering, recognizing, obtaining, or otherwise accepting delivery of the first query from the first application program that indicates the first data format. The first query may include an inquiry, set of instructions, commands, or request for data or information from the single DBMS. The query may include a select query (e.g., data retrieval query), an action query (e.g., request for an operation such as insertion, updating, or deletion to be performed on a set of data), or other type of query. The first query may be received from a first application program. The first application program may include a computer program, collection of computer instructions configured for a specific purpose, or other type of software. In embodiments, the first query may indicate a first data format. As described herein, the first data format may include a pre-determined standard that defines the arrangement, composition, or organization of a set of data. The first data format may define the structure (e.g., how data is organized) as well as the encoding (e.g., how bits are used to encode information in a digital storage medium) for the set of data. In embodiments, receiving may include collecting a first query that has been submitted by the first application program. The first query may be structured according to the first data format (e.g., a JSON query). In embodiments, receiving may include detecting a first query received by the first application that requests a particular set of data stored in the single database. In certain embodiments, the first query may request that the particular set of data be provided in the first data format. As an example, a DBMS interface engine may receive a first query of "return rows L-Y from Table A in JSON format" from the first application program. In embodiments, a second query may be received by the DBMS interface engine at block 320. The second query may be received from a second application program that indicates a second data format. In embodiments, receiving the second query may include ascertaining that the second query has been submitted by the second application program. The second query may include an inquiry, set of instructions, commands, or request for data or information from the DBMS that is separate from the first query. In embodiments, the second query may be structured according to the second data format (e.g., relational format, SQL format). In embodiments, the second query may include a request that specifies that a set of data stored in the single database be provided in the second data format, where the second data format is different than the first data format. As an example, the second query may request that the single database "return rows D-M from Table B in a relational format." Other methods of receiving the first query from the first application program that indicates the first data format and receiving the second query from the second application program that indicates the second data format are also possible.

At block 330, a single database of the single DBMS may be searched. The searching may occur based on the first query from the first application program that indicates the first data format. Generally, searching can include seeking, inspecting, inquiring, investigating, or otherwise examining the single database of the single DBMS. In embodiments, searching the single database based on the first query from the first application program may include investigating the single database to locate a set of data requested by the first query. For instance, with reference to the previous example in which a first query of "return Rows L-Y from Table A in JSON format" was received from the first application program, searching may include attempting to locate "Table A" within the single database of the single DBMS, and subsequently identifying "Rows L-Y" as specified by the first query. At block 340, the single database of the single DBMS may be searched based on the second query from the second application program that indicates the second data format. As described herein, in embodiments, searching the single database based on the second query from the second application program may include examining the single database to locate a set of data requested by the second query. As an example, with reference to the previous example in which a second query of "return rows D-M from Table B in a relational format" was received from the second application program, searching may include attempting to locate "Table B" within the single database of the single DBMS, and subsequently identifying "Rows D-M" as specified by the second query. In embodiments, searching the single database may include parsing the holistic data structure to identify a data construct that includes the data requested by the first or second query. Other methods of searching the single DBMS are also possible.

At block 350, a first valid search result for the first query may be resolved. The resolving may occur both based on and in response to searching the single database of the single DBMS. The first valid search result for the first query may correspond to the first data format. Generally, resolving can include computing, formulating, calculating, detecting, identifying, or otherwise ascertaining the first valid search result for the first query. The first valid search result may include a collection of data returned to resolve the first query. The first valid search result may include a set of data specifically requested by the first query or data that is determined to be relevant with respect to the first query. In embodiments, resolving the first valid search result may include ascertaining a portion of data stored within the single DBMS that achieves a similarity threshold with respect to a set of data specified by the first query. In certain embodiments, resolving the first valid search result may include identifying a data construct within the holistic data model that includes the data requested by the first query. As an example, for a first query that requests a value for "the atomic mass of hydrogen," resolving the first query may include searching the single database (e.g., the data constructs of the holistic data model) and ascertaining a valid search result of "1 AMU" for the first query. At block 360, a second valid search result for the second query may be resolved (e.g., computed, formulated, calculated, detected, identified, ascertained). The resolving may occur both based on and in response to searching the single database of the single DBMS. The second valid search result may include a collection of data returned to resolve the second query. The first valid search result may include a set of data specifically requested by the second query or data that is determined to be relevant with respect to the second query. In embodiments, resolving the second valid search result may include ascertaining a portion of data stored within the single DBMS that achieves a similarity threshold with respect to a set of data specified by the second query. In certain embodiments, resolving the second valid search result may include identifying a data construct within the holistic data model that includes the data requested by the second query. As an example, for a second query that requests a list of "states in the Midwest" resolving the first query may include searching the single database (e.g., the data constructs of the holistic data model) and ascertaining a valid search result of "Illinois, Indiana, Iowa, Kansas, Michigan, Minnesota, Missouri, Nebraska, North Dakota, Ohio, South Dakota, Wisconsin" for the second query. In embodiments, At block 370, the first valid search result may be provided. The providing may be performed by the DBMS interface engine. The providing may occur responsive to the first query from the first application program that indicates the first data format. The first valid search result for the first query may correspond to the first data format. Generally, providing can include preparing, supplying, yielding, displaying, conveying, returning, or otherwise presenting the first valid search result. In embodiments, providing may include giving, communicating, or otherwise returning the first valid search result in response to the first query. Aspects of the disclosure, in embodiments, relate to providing the valid search results in the same format as that of the original query (e.g., to facilitate flexibility and compatibility between the single DBMS and other application programs). Accordingly, in response to receiving a first query that indicates (e.g., corresponds to) a first data format, the first valid search result may be structured according to the first data format and provided in response to the first query. Consider the following example. In response to receiving a first query corresponding to a relational data format, the first valid search result resolved based on searching the single DBMS may be structured according to the relational data format and provided in response to the first query. At block 380, the second valid search result may be provided (e.g., prepared, supplied, yielded, displayed, conveyed, returned, presented). The providing may be performed by the DBMS interface engine. The providing may occur responsive to the second query from the second application program that indicates the second data format. The second valid search result for the second query may correspond to the second data format. Providing may include returning the second valid search result in response to the second query from the second application program. As described herein, in embodiments, the second valid search result may be provided in the same format as the second query. Consider the following example. In response to receiving a second query corresponding to a graph data format, the second valid search result resolved based on searching the single DBMS may be structured according to the graph data format and provided in response to the second query. Other methods of providing the first valid search result and the second valid search result are also possible.

Method 300 concludes at block 399. As described herein, aspects of method 300 relate to managing a single DBMS. Aspects of method 300 may provide performance or efficiency benefits related to managing a single DBMS. As an example, processing and resolving requests in their native data formats may facilitate data flexibility and interoperability between application programs. Altogether, leveraging a single database management system for handling data regardless of format may be associated with benefits such as flexibility, query processing, and database management efficiency. Aspects may save resources such as bandwidth, processing, or memory.

Figure 5:
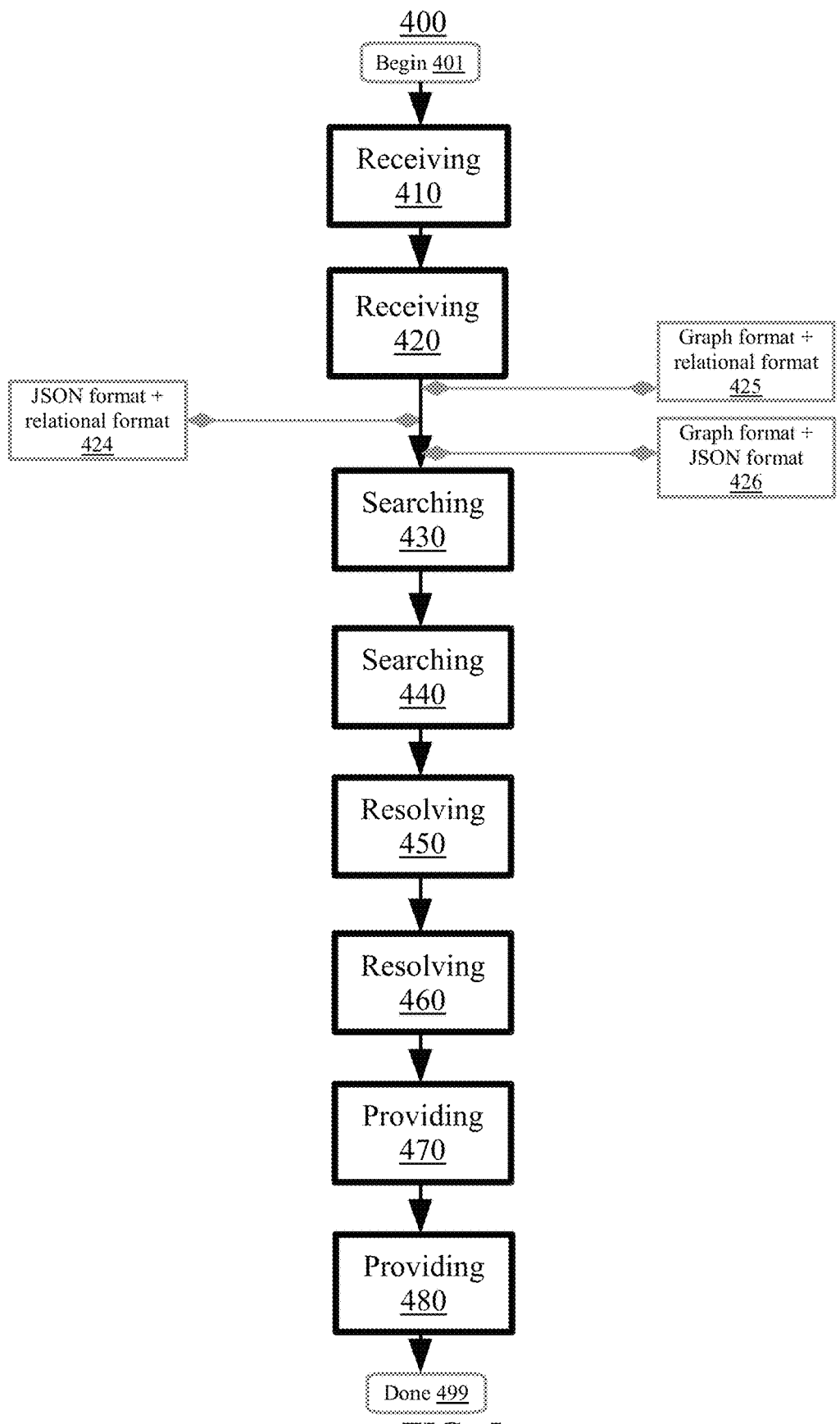
FIG. 5 is a flowchart illustrating a method for managing a single DBMS, according to embodiments.

FIG. 5 is a flowchart illustrating a method 400 for managing a single DBMS which interfaces with both a first application program that indicates a first data format and a second application program that indicates a second data format. Aspects of method 400 relate to the recognition that, in some embodiments, the single DBMS may be used to interface with application programs in a variety of different data formats. For instance, the single DBMS may be configured to simultaneously manage and resolve queries structured according to different data formats (e.g., JSON, graph, relational). Aspects of method 400 may be similar or the same aspects of method 200/300, and aspects may be utilized interchangeably with one or more methodologies described herein. The method 400 may begin at block 401. At block 410, a first query may be received. The receiving may be performed by a DBMS interface engine. The first query may be received from the first application program that indicates the first data format. At block 420, a second query may be received. The receiving may be performed by the DBMS interface engine. The second query may be received from the second application program that indicates the second data format. The first data format may differ from the second data format.

In embodiments, the single database may manage a JavaScript Object Notation (JSON) format and a relational format at block 424. The DBMS interface engine may identify that the first data format is a JSON format. The DBMS interface engine may identify that the second data format is a relational format. Generally, identifying can include detecting, sensing, recognizing, ascertaining, or otherwise determining that the first data format is a JSON format and the second data format is a relational format. In embodiments, identifying may include examining the encoding of the first query and the second query with respect to an encoding index of known encodings for different data formats in order to ascertain the data format corresponding to each query. Accordingly, based on the comparison between the encoding of the first and second queries with the encoding index, it may be determined that the first data format (e.g., of the first query) corresponds to a JSON format, and that the second data format corresponds to a relational format. In embodiments, the first valid search result may be provided by the DBMS interface engine using the JSON format. The second valid search result may be provided by the DBMS interface engine using the relational format. Generally, providing can include preparing, supplying, yielding, displaying, conveying, returning, or otherwise presenting the first valid search result using the JSON format and the second valid search result using the relational format. In embodiments, providing the first and second valid search results may include structuring the first valid search result according to the JSON format, structuring the second valid search result according to the relational format, and returning both the first and second valid search results to resolve the first and second queries, respectively. Other methods of identifying the JSON format and the relational format and providing the first and second valid search results using the JSON format and the relational format are also possible.

In embodiments, the single database may manage a relational format and a graph format at block 425. The DBMS interface engine may identify that the first data format is a relational format. The DBMS interface engine may identify that the second data format is a graph format. Generally, identifying can include detecting, sensing, recognizing, ascertaining, or otherwise determining that the first data format is a relational format and that the second data format is a graph format. In embodiments, identifying may include analyzing the data structure of the first query and the second query in order to ascertain a data format identifier (e.g., file extension, marker, special character) that indicates the data format of the first query and the second query. Accordingly, based on the data format identifier ascertained by analyzing the data structure of the first and second query, it may be determined that the first data format (e.g., of the first query) corresponds to a relational format, and that the second data format (e.g., of the second query) corresponds to a graph format. In embodiments, the first valid search result may be provided by the DBMS interface engine using the relational format. The second valid search result may be provided by the DBMS interface engine using the graph format. Generally, providing can include preparing, supplying, yielding, displaying, conveying, returning, or otherwise presenting the first valid search result using the relational format and the second valid search result using the graph format. In embodiments, providing the first and second valid search results may include structuring the first valid search result according to the relational format, structuring the second valid search result according to the graph format, and returning both the first and second valid search results to resolve the first and second queries, respectively. Other methods of identifying the relational format and the graph format and providing the first and second valid search results using the relational format and the graph format are also possible.

In embodiments, the single database may manage a graph format and a JSON format at block 426. The DBMS interface engine may identify that the first data format is a graph format. The DBMS interface engine may identify that the second data format is a JSON format. Generally, identifying can include detecting, sensing, recognizing, ascertaining, or otherwise determining that the first data format is a graph format and that the second data format is a JSON format. In embodiments, identifying may include performing a file test with respect to the first application program and the second application program. The file test may instruct the first application program and the second application program to provide indication/classification of the first data format and the second data format, respectively. Accordingly, in response to the file test, the first application program may provide an indication that the first data format is a graph format, and the second application program may provide an indication that the second data format is a JSON format. The first valid search result may be provided by the DBMS interface engine using the graph format. The second valid search result may be provided by the DBMS interface engine using the JSON format. Generally, providing can include preparing, supplying, yielding, displaying, conveying, returning, or otherwise presenting the first valid search result using the graph format and the second valid search result using the JSON format. In embodiments, providing the first and second valid search results may include structuring the first valid search result according to the graph format, structuring the second valid search result according to the JSON format, and returning both the first and second valid search results to resolve the first and second queries, respectively. Other methods of identifying the graph format and the JSON format and providing the first and second valid search results using the graph format and the JSON format are also possible.

At block 430, a single database of the single DBMS may be searched. The searching may occur based on the first query from the first application program that indicates the first data format. At block 440, the single database of the single DBMS may be searched. The searching may occur based on the second query from the second application program that indicates the second data format. At block 450, a first valid search result for the first query may be resolved. The resolving may occur both based on and in response to searching the single database of the single DBMS. At block 460, a second valid search result for the second query may be resolved. The resolving may occur both based on and in response to searching the single database of the single DBMS. At block 470, the first valid search result may be provided. The providing may be performed by the DBMS interface engine. The providing may occur responsive to the first query from the first application program that indicates the first data format. At block 480, the second valid search result may be provided. The providing may be performed by the DBMS interface engine. The providing may occur responsive to the second query from the second application program that indicates the second data format. Method 400 concludes at block 499. As described herein, aspects of method 400 relate to managing a single DBMS. Aspects of method 400 may provide performance or efficiency benefits related to managing a single DBMS. Aspects may save resources such as bandwidth, processing, or memory.

Figure 6:
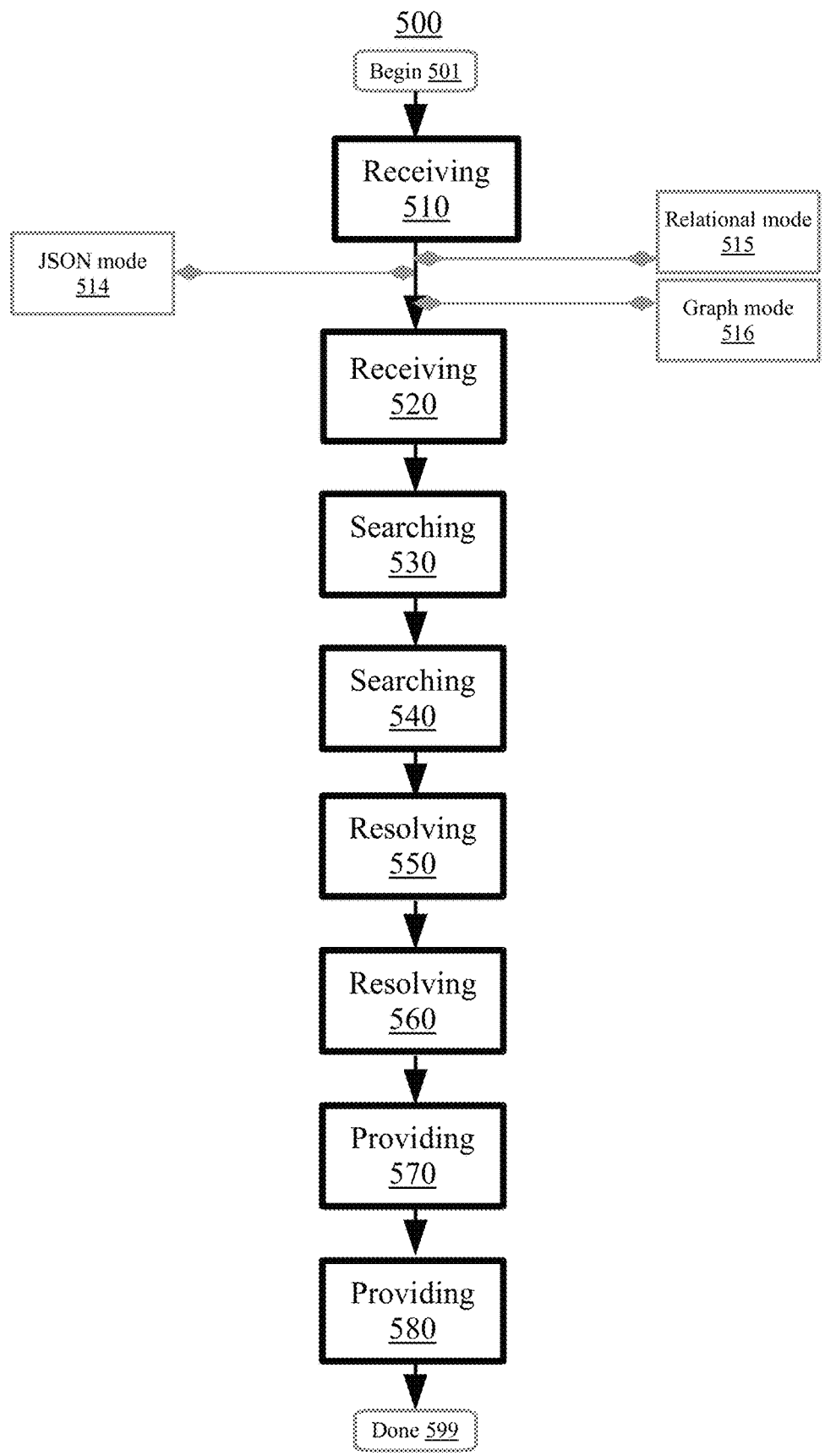
FIG. 6 is a flowchart illustrating a method for managing a single DBMS, according to embodiments.

FIG. 6 is a flowchart illustrating a method 500 for managing a single DBMS which interfaces with both a first application program that indicates a first data format and a second application program that indicates a second data format. Aspects of method 500 relate to resolving search results for queries received by the single database using a plurality of data formats. The search results may be resolved using the same data format in which the original query was received. Aspects of method 500 may be similar or the same aspects of method 200/300/400, and aspects may be utilized interchangeably with one or more methodologies described herein. The method 500 may begin at block 501. At block 510, a first query may be received. The receiving may be performed by a DBMS interface engine. The first query may be received from the first application program that indicates the first data format.

In embodiments, a JSON mode may be selected by the DBMS interface engine at block 514. The JSON mode may be selected based on at least one data format having a JSON format. Generally, selecting can include choosing, picking, deciding, identifying, or electing the JSON mode based on the at least one data format having the JSON format. The JSON mode may include an operational configuration of the DBMS interface engine in which the DBMS engine is configured to interface with application programs, structure data, and resolve queries using the JSON mode. In embodiments, selecting the JSON mode may include ascertaining that a query received by the DBMS interface engine corresponds to the JSON mode, and subsequently configuring the DBMS interface engine to the JSON mode. The single database of the single DBMS may be searched. The searching may be performed using the JSON mode. Generally, searching can include seeking, inspecting, inquiring, investigating, or otherwise examining the single database of the single DBMS using the JSON mode. In embodiments, searching the single database using the JSON mode may include analyzing the content of the single database with respect to a set of JSON data syntax types (e.g., numbers, strings, booleans, arrays, objects, nulls) to identify a match with respect to the JSON query received by the DBMS interface engine. At least one valid JSON search result may be resolved using the JSON mode. Generally, resolving can include computing, formulating, calculating, detecting, identifying, or otherwise ascertaining the at least one valid JSON search result. The JSON search result may include a collection of data structured according to the JSON data format that achieves a similarity threshold with respect to a set of data requested by the JSON query. In embodiments, resolving the JSON search result may include identifying a set of data within a data construct of the holistic data model that achieves a similarity threshold with respect to a set of data requested by the JSON query, and subsequently organizing the set of data in a JSON format to be returned in response to the JSON query. Other methods of selecting the JSON mode, searching the single database using the JSON mode, and resolving at least one valid JSON search result using the JSON mode are also possible.

In embodiments, a relational mode may be selected at block 515. The selecting may be performed by the DBMS interface engine. The relational mode may be selected based on at least one data format having a relational format. Generally, selecting can include choosing, picking, deciding, identifying, or electing the relational mode based on the at least one data format having the relational format. The relational mode may include an operational configuration of the DBMS interface engine in which the DBMS engine is configured to interface with application programs, structure data, and resolve queries using the relational mode. In embodiments, selecting the relational mode may include ascertaining that a query received by the DBMS interface engine corresponds to the relational mode (e.g., includes SQL query language), and subsequently configuring the DBMS interface engine to the relational mode. The single database of the single DBMS may be searched. The searching may be performed using the relational mode. Generally, searching can include seeking, inspecting, inquiring, investigating, or otherwise examining the single database of the single DBMS using the relational mode. In embodiments, searching the single database using the relational mode may include identifying one or more SQL query keywords or clauses (e.g., FROM, WHERE, GROUP BY, HAVING, ORDER BY, DISTINCT, SELECT) that indicate an action to be taken with respect to a set of requested data, and subsequently performing the indicated action to process the set of requested data. As an example, in response to identifying an SQL query keyword of "WHERE," the search for the set of requested data may be restricted to the area (e.g., rows, columns, data constructs) specified by the "WHERE" clause. At least one valid relational search result may be resolved using the relational mode. Generally, resolving can include computing, formulating, calculating, detecting, identifying, or otherwise ascertaining the at least one valid relational search result. The relational search result may include a collection of data structured according to the relational data format that achieves a similarity threshold with respect to a set of data requested by the relational query. In embodiments, resolving the relational search result may include identifying a set of data within a data construct of the holistic data model that achieves a similarity threshold with respect to a set of data requested by the relational query, and subsequently organizing the set of data in a relational format to be returned in response to the relational query. Other methods of selecting the relational mode, searching the single database using the relational mode, and resolving at least one valid relational search result using the relational mode are also possible.

In embodiments, a graph mode may be selected at block 516. The selecting may be performed by the DBMS interface engine. The graph mode may be selected based on at least one data format having a graph format. Generally, selecting can include choosing, picking, deciding, identifying, or electing the graph mode based on the at least one data format having the graph format. The graph mode may include an operational configuration of the DBMS interface engine in which the DBMS engine is configured to interface with application programs, structure data, and resolve queries using the graph mode. In embodiments, selecting the graph mode may include ascertaining that a query received by the DBMS interface engine corresponds to the graph mode, and subsequently configuring the DBMS interface engine to the graph mode. The single database of the single DBMS may be searched using the graph mode. Generally, searching can include seeking, inspecting, inquiring, investigating, or otherwise examining the single database of the single DBMS using the graph mode. In embodiments, searching the single database using the graph mode may include examining the holistic data model in order to identify one or more nodes, edges, or properties of the data constructs in the holistic data model that correspond to nodes, edges, or properties of the set of data requested by the graph query. As an example, searching may include ascertaining that a node of "inventory items" corresponds with a node of "inventory item data" specified by the graph request. At least one valid graph search result may be resolved using the graph mode. Generally, resolving can include computing, formulating, calculating, detecting, identifying, or otherwise ascertaining the at least one valid relational search result. The relational search result may include a collection of data structured according to the graph data format that achieves a similarity threshold with respect to a set of data requested by the graph query. In embodiments, resolving the graph search result may include identifying a set of data (e.g., node, edge, property) within a data construct of the holistic data model that achieves a similarity threshold with respect to a set of data requested by the graph query, and subsequently organizing the set of data in a graph format to be returned in response to the graph query. Other methods of selecting the graph mode, searching the single database using the graph mode, and resolving at least one valid graph search result using the graph mode are also possible.

At block 520, a second query may be received. The receiving may be performed by the DBMS interface engine. The second query may be received from the second application program that indicates the second data format. The first data format may differ from the second data format. At block 530, a single database of the single DBMS may be searched based on the first query from the first application program that indicates the first data format. At block 540, the single database of the single DBMS may be searched based on the second query from the second application program that indicates the second data format. At block 550, a first valid search result for the first query may be resolved. The resolving may occur both based on and in response to searching the single database of the single DBMS. At block 560, a second valid search result for the second query may be resolved. The resolving may occur both based on and in response to searching the single database of the single DBMS. At block 570, the first valid search result may be provided. The providing may be performed by the DBMS interface engine. The providing may occur responsive to the first query from the first application program that indicates the first data format. At block 580, the second valid search result may be provided. The providing may be performed by the DBMS interface engine. The providing may occur responsive to the second query from the second application program that indicates the second data format. Method 500 concludes at block 599. As described herein, aspects of method 500 relate to managing a single DBMS. Aspects of method 500 may provide performance or efficiency benefits related to managing a single DBMS. Aspects may save resources such as bandwidth, processing, or memory.

Figure 7:
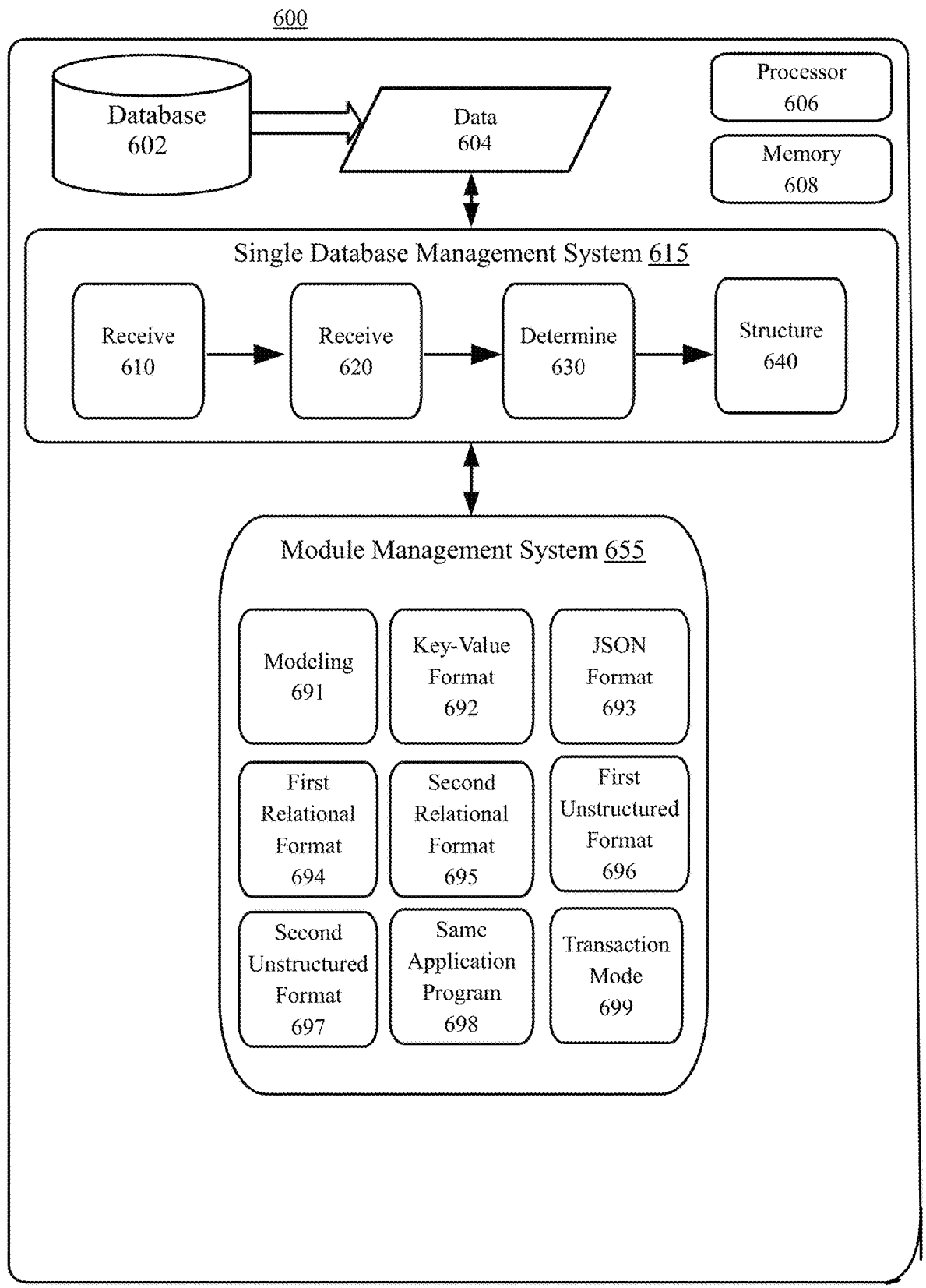
FIG. 7 depicts an example system for managing a single DBMS, according to embodiments.

FIG. 7 depicts an example system 600 managing a single DBMS which interfaces with both a first application program that indicates a first data format and a second application program that indicates a second data format, according to embodiments. The example system 600 may include a processor 606 and a memory 608. The example system 600 may include a database 602 configured to maintain and organize data and records in a set of formally described tables from which data can be accessed or reassembled. In embodiments, the example system 600 may include a single database management system 615. The single database management system 615 may be communicatively connected to the database 602, and be configured to receive data 604 (e.g., queries, requests, instructions for database operations) related to single database management system. The single database management system 615 may include a first receiving module 610 to receive a first data set, a second receiving module 620 to receive a second data set, a determining module 630 to determine a holistic data model to represent the first data set and the second data set, and a structuring module 640 to structure the holistic data model with respect to the single database of the single DBMS. The single database management system 615 may be communicatively connected with a module management system 655 which includes a set of modules for implementing aspects of single database management.

In embodiments, modeling may occur at module 691. The holistic data model may be modeled with respect to the single database of the single DBMS using a graph having a set of vertices and a set of edges. Generally, modeling can include displaying, expressing, creating, assembling, generating, building, or otherwise representing the holistic data model with respect to the single database of the single DBMS. As described herein, aspects of the disclosure relate to representing data within the single database of the single DBMS using a holistic data structure configured to ingest and interpret data structured according to one or more different data formats, and represent it as a series of data constructs. The data constructs may include graph-based data structures in which data objects are expressed as vertices (e.g., points of intersection between data constructs), and relations between vertices are represented by edges (e.g., lines that connect nodes to other nodes). Each vertex and edge may have one or more properties that indicate the attributes of each respective data object. In embodiments, the data constructs may include one or more nodes to represent entities such as people, businesses, accounts, or other items within the data construct. In embodiments, modeling may include applying a set of format-specific arrangement rules that define how the first and second data sets may be represented as data constructs within the holistic data model. As an example, modeling may include using the set of arrangement rules to assemble one or more data constructs to represent a set of data within the holistic data model with respect to the single database of the single DBMS. Other methods of modeling the holistic data model with respect to the single database of the single DBMS are also possible.

In embodiments, a key-value format may be modeled at module 692. A set of spaces may be compiled in the DBMS with respect to a key-value format. Generally, compiling can include aggregating, collecting, composing, organizing, arranging, or assembling the set of spaces. The set of spaces may include graph head nodes related to a set of typologies. The set of typologies may include an index or systematic classification of items, entities, or other data objects represented by a particular data construct. For example, the set of spaces may include information about the primary data type/function of that data construct (e.g., inventory item tracking, employee database). In embodiments, compiling the set of spaces may include establishing a space (e.g., head node) for each data construct of a set of data constructs in the holistic data model, and assigning one or more typologies to each space to indicate the role of the data construct. A set of edges may be constructed in the DBMS with respect to the key-value format. Generally, constructing can include arranging, building, organizing, forming, creating, generating, or otherwise establishing the set of edges based on the set of key-values. As described herein, the set of edges may include lines that connect nodes to other nodes to indicate the relationships between different spaces within the holistic data model. In embodiments, the set of edges may be constructed based on a set of key-values of the key-value format. The set of key-values may include a pair of data objects consisting of a key (e.g., unique identifier) and a value (e.g., record, data set) identified by the key. In embodiments, constructing may include using the set of edges to connect a first space associated with a key to a second space associated with a corresponding value identified by the key of the first space. A set of keys may be identified in the DBMS with respect to the key-value format. Generally, identifying can include detecting, sensing, recognizing, ascertaining, or otherwise determining the set of keys with respect to the key-value format. As described herein, the set of keys may include unique identifiers to indicate a particular data set. In embodiments, identifying the set of keys may include assigning a key to one or more spaces of the set of spaces. The set of keys may indicate a set of values. For instance, the set of keys may be used to locate particular values maintained by connected data constructs within the holistic data model. As an example, in response to receiving a query with respect to the holistic data model that includes a request for a value associated with a particular key, the space corresponding to the specified key may be identified, and an edge associated with the space may be followed to a connected space maintaining the requested value. Other methods of modeling the key-value format are also possible.

In embodiments, a JSON format may be modeled at module 693. A set of spaces may be compiled in the DBMS with respect to a JSON format. The set of spaces may include information related to a set of typologies. Generally, compiling can include aggregating, collecting, composing, organizing, arranging, or assembling the set of spaces with respect to the JSON format. In embodiments, compiling the set of spaces may include establishing a space (e.g., head node) for each data construct of a set of data constructs in the holistic data model, and assigning one or more typologies to each space to indicate the role of the data construct. A primary key may be identified (detected, sensed, recognized, ascertained, determined) in the DBMS with respect to the JSON format. The primary key may include a sequence of characters that may be used to uniquely identify one or more records within the single database. In embodiments, identifying the primary key may include generating a data string (e.g., hash value) that is mathematically related to the set of keys corresponding to the set of spaces (e.g., such that the set of spaces may be uniquely referenced using a single key). A set of separate nodes may be structured (e.g., arranged, built, organized, formed, created, generated, established) in the DBMS with respect to the JSON format. A set of separate nodes may be structured to include a set of sub-documents. The set of separate nodes may include secondary nodes (e.g., spaces) that are associated with or connected to primary nodes (e.g., head nodes). The set of sub-documents may include individual documents that are grouped and organized by a master document. In embodiments, structuring the set of separate nodes may include assigning an individual sub-document to each node of the set of separate nodes, and connecting each node of the set of separate nodes to a primary node (e.g., head node) using an edge. An array may be structured (e.g., arranged, built, organized, formed, created, generated, established) in the DBMS with respect to the JSON format. The array may include a systematic arrangement (e.g., using rows and columns) of data objects. The array may be configured to maintain a set of separate data. The set of separate data may include a set of values (e.g., integers) which has a key that uses an array index. The array index may include a representational data structure that defines dimensions and attributes for each entry in the array to support in-context data analytics. In embodiments, structuring the array may include compiling a set of keys corresponding to the data constructs in the holistic data model, and linking each key of the array with a corresponding entry of the array index. Other methods of modeling the JSON format are also possible.

In embodiments, a first relational format may be modeled at module 694. A set of spaces may be compiled (aggregated, collected, composed, organized, arranged, assembled) in the DBMS with respect to a first relational format. The set of spaces may include information related to a set of typologies. As described herein, compiling the set of spaces may include establishing a space (e.g., head node) for each data construct of a set of data constructs in the holistic data model, and assigning one or more typologies to each space to indicate the role of the data construct. A set of edges may be constructed (e.g., arranged, built, organized, formed, created, generated, established) in the DBMS with respect to the relational format. The set of edges may be constructed based on a relationship between a plurality of respective spaces of the set of spaces. For instance, the relation between different spaces may be represented via edges that span between spaces. In embodiments, constructing the set of edges may include establishing a link, tie, connection, or association between a first space and a second space. Consider the following example. A holistic data model may include a first data structure having a space associated with a typology of "Employee Names." Accordingly, in embodiments, constructing the set of edges may include forming a connection between the space of "Employee Names" and a space associated with a typology of "Employee Serial Numbers" (e.g., both spaces represent related concepts within the holistic data model). Other methods of modeling the first relational format are also possible.

In embodiments, a second relational format may be modeled at module 695. A set of spaces may be compiled (e.g., aggregated, collected, composed, organized, arranged, assembled) in the DBMS with respect to a second relational format. The set of spaces may include a respective node for a respective atomic value. The atomic value may include a piece of data in a database table that cannot be broken down (e.g., indivisible by database operations). In embodiments, compiling the set of spaces may include generating a separate node corresponding to each atomic value present in a set of received data. A set of edges may be constructed (e.g., arranged, built, organized, formed, created, generated, established) in the DBMS with respect to the relational format. The set of edges may be constructed based on a relationship between a plurality of respective same-column value nodes of the set of spaces. For instance, the set of edges may be constructed such that a value node will be connected by an edge to another node representing a value for the same column (e.g., to facilitate efficient column traversal). Consider the following example. A holistic data model may include a first data structure having a space of "Department Space." The space of "Department Space" may be associated with a first value node of "Marketing" and a second value node of "Research and Development." Accordingly, constructing the set of edges may include establishing a link or connection between the first value node of "Marketing" and the second value node of "Research and Development." Other methods of modeling the second relational format are also possible.

In embodiments, a first unstructured format may be modeled at module 696. A set of spaces may be compiled (e.g., aggregated, collected, composed, organized, arranged, assembled) in the DBMS with respect to a first unstructured format. The set of spaces may be compiled using a natural language processing technique. The natural language processing technique may include one or more computer-based algorithms configured to derive meaning from natural language content. As examples, the natural language processing technique may include algorithms configured for part-of-speech tagging, parsing, relationship extraction, sentiment analysis, information retrieval, information extraction, morphological segmentation, and the like. In embodiments, compiling the set of spaces may include using the natural language processing technique to parse a set of unstructured data (e.g., data from emails, image captions, documents), and generating a set of spaces to represent the entities identified from the set of unstructured data. A set of edges may be constructed (e.g., arranged, built, organized, formed, created, generated, established) in the DBMS with respect to the unstructured format. The set of edges may be constructed based on a set of key natural language characteristics between a plurality of respective spaces of the set of spaces. The set of key natural language characteristics may include particular traits, attributes, names, elements, or other aspects that hold particular meaning or significance in particular contexts. The set of key natural language characteristics may be determined using rule-based text analytics or classified based on machine learning techniques. In embodiments, constructing the set of edges may include establishing relationships between the set of key natural language characteristics to facilitate data search and retrieval with respect to the holistic data model/single database (e.g., such that search terms will hit/correspond to a wider range of search results). Other methods of modeling the first unstructured format are also possible.

In embodiments, a second unstructured format may be modeled at module 697. A set of spaces may be compiled (e.g., aggregated, collected, composed, organized, arranged, assembled) in the DBMS with respect to a second unstructured format. The set of spaces may be compiled using an image processing technique. The image processing technique may include one or more computer-based algorithms configured to extract meaningful information from images. As examples, the image processing technique may include 2D and 3D object recognition, image segmentation, motion detection, single particle tracking, video tracking, optical flow, and the like. In embodiments, compiling the set of spaces may include using the image processing technique to parse a set of unstructured image data (e.g., data from images, photographs, videos), and generate a set of spaces to represent the entities identified from the set of unstructured image data. As an example, in response to parsing an image of a group of individuals at a company picnic, each individual in the picture may be identified (e.g., using a facial recognition database), and a separate space may be generated for each individual identified in the picture. A set of edges may be constructed (e.g., arranged, built, organized, formed, created, generated, established) in the DBMS with respect to the unstructured format. The set of edges may be constructed based on a set of key image characteristics between a plurality of respective spaces of the set of spaces. The set of key image characteristics may include particular traits, attributes, names, elements, or other aspects of the set of unstructured data that visually describe, summarize, or represent the content of the set of unstructured data. In embodiments, constructing the set of edges may include establishing relationships between the set of key image characteristics to facilitate data search and retrieval with respect to the holistic data model/single database (e.g., such that search terms will hit/correspond to a wider range of search results). Other methods of modeling the second unstructured format are also possible.

In embodiments, a same application program may be detected at module 698. It may be detected that both the first query (from the first application program that indicates the first data format) and the second query (from the second application program that indicates the second data format) are from the same application program. Generally, detecting can include sensing, recognizing, ascertaining, identifying, or otherwise determining that the first query and the second query are from the same application program. Aspects of the disclosure relate to the recognition that, in certain embodiments, a single application program may be configured to operate on data using a plurality of data formats. For instance, an application program including a spreadsheet management program may be configured to maintain data in both relational and graph-based formats. As such, in certain embodiments, it may be detected that the first query and the second query were submitted by a single application program that includes both the first application program and the second application program. In embodiments, detecting that the first query and the second query are from the same application program may include analyzing a source memory address for both the first query and the second query, and determining that the source memory address for the first query matches (e.g., is identical to, substantially agrees with, achieves a similarity threshold with respect to) the source memory address for the second query (e.g., indicating that the first and second queries were submitted by the same application program). Other methods of detecting that the first query and the second query are from the same application program are also possible.

In embodiments, a transaction mode may be detected and configured at module 699. A transaction behavior parameter may be detected by the DBMS interface engine. Generally, detecting can include sensing, recognizing, ascertaining, identifying, or otherwise determining the transaction behavior parameter by the DBMS interface engine. The transaction behavior parameter may include a criterion, characteristic, requirement, condition, stipulation or attribute of a query or application that indicates how data from the query or application should be processed or managed by the DBMS interface engine. As an example, detecting the transaction behavior parameter may include identifying that a particular query is associated with a requirement that it be managed with strict ACID compliance. In embodiments, a transaction mode may be configured by the DBMS interface engine. The transaction mode may be configured for which to operate management of the single DBMS. Generally, configuring can include programming, setting-up, arranging, instructing, or instantiating the transaction mode. The transaction mode may include an operational configuration of the single DBMS that defines the data format in which the single DBMS will interface with other application programs. As examples, the transaction mode may include a graph transaction mode for handling data in a graph data format, a relational transaction mode for handling data in a relational data format, a JSON transaction mode for handling data in a JSON format, or the like. As described herein, in embodiments, the transaction mode may be configured based on the transaction behavior parameter. For example, with reference to the previous example in which a transaction behavior parameter indicates that a particular query is associated with a requirement that it be managed with strict ACID compliance, the transaction mode of the single DBMS may be configured to a relational mode. Other methods of detecting the transaction behavior parameter and configuring the transaction mode for the single DBMS are also possible.

Figure 8:
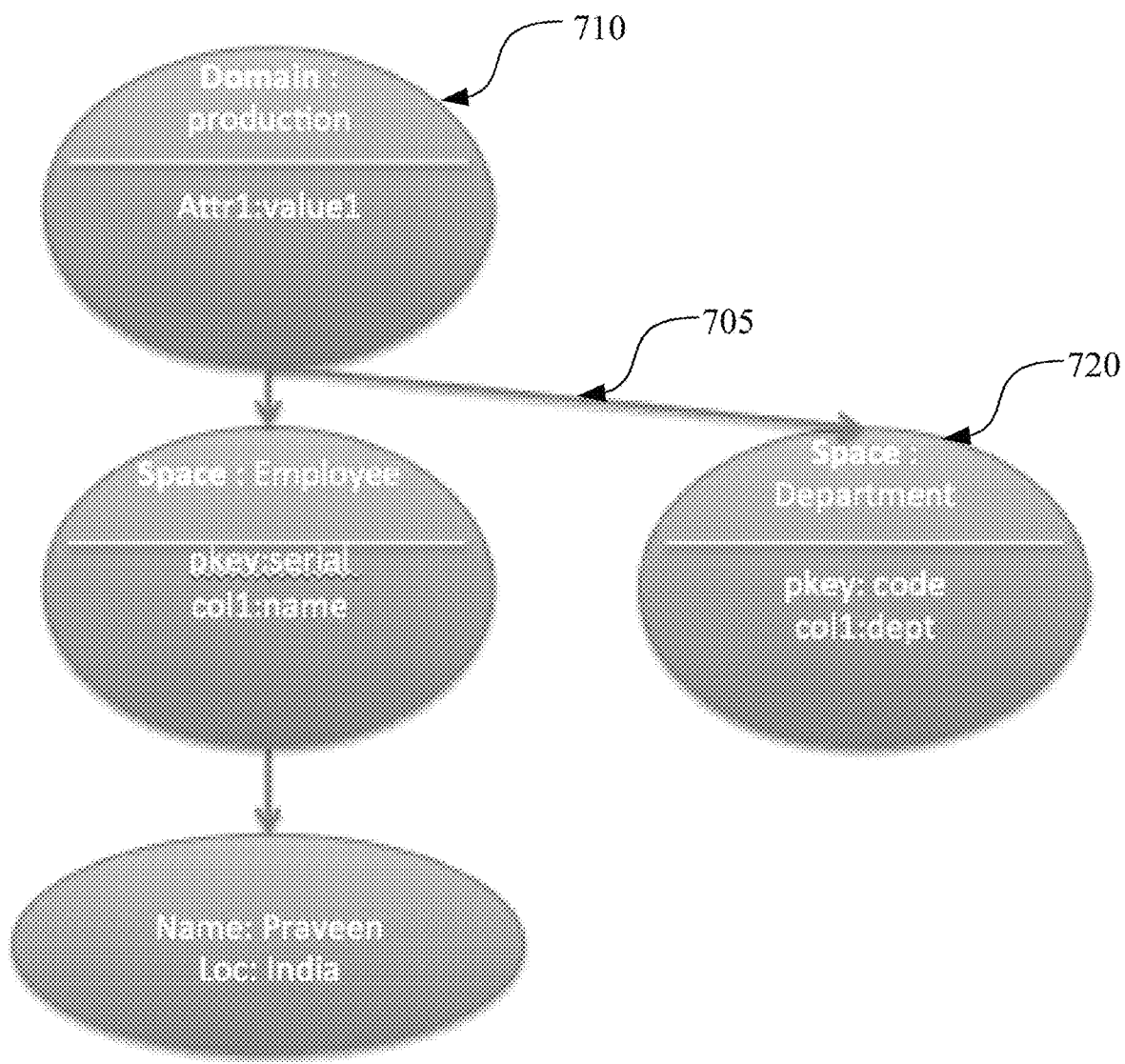
FIG. 8 depicts a set of data constructs for data management in a single DBMS which interfaces with both a first application program that indicates a first data format and a second application program that indicates a second data format, according to embodiments.

FIG. 8 depicts a set of data constructs 700 for data management in a single DBMS which interfaces with both a first application program that indicates a first data format and a second application program that indicates a second data format, according to embodiments. The set of data constructs 700 may be used to represent data received in various different data formats as part of a holistic data model (e.g., irrespective of data format) to facilitate flexible data maintenance and retrieval. As described herein, the set of data constructs 700 may include a head node 710 connected to a set of spaces (e.g., nodes) via a set of edges. The set of edges may include connections that establish relationships between related spaces within the set of data constructs 700. The head node 710 may include a typology (e.g., production) that defines information regarding the type/function of the set of data constructs 700. The head node may be linked with one or more spaces that include related typologies. As an example, head node 710 may be linked with space 720 via edge 705 to establish a relationship between the typology of "production" and the typology of "department." As such, data may be organized and maintained using the set of data constructs 700 in the holistic data model of the single DBMS irrespective of data format (e.g., application programs may fetch data and interface with the single DBMS in their native data format).

Figure 9:
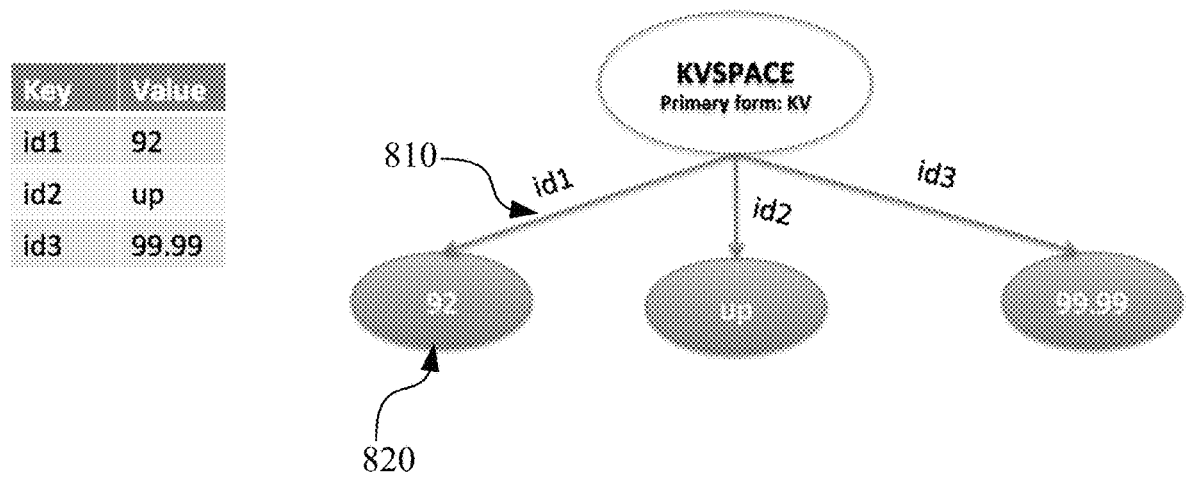
FIG. 9 depicts a set of data constructs to represent a data set corresponding to a key-value format in a single DBMS, according to embodiments.

FIG. 9 depicts a set of data constructs 800 to represent a data set corresponding to a key-value format in a single DBMS, according to embodiments. As described herein, aspects of the disclosure relate to using the set of data constructs 800 to represent data regardless of data format. In embodiments, the set of data constructs 800 may be structured based on the data format in which a set of data is received. Accordingly, aspects of FIG. 9 relate to a set of data constructs 800 to represent data received in a key-value format. In embodiments, the set of data constructs may be structured such that keys indicated by the set of data are assigned to edges, and the corresponding values for each key may be assigned to spaces. As an example, as shown in FIG. 9, edge 810 may be assigned a key of "id1" and space 820 may be assigned a value corresponding to the key of "92." Other methods of structuring the set of data constructs 800 to represent the key-value format are also possible.

Figure 10:
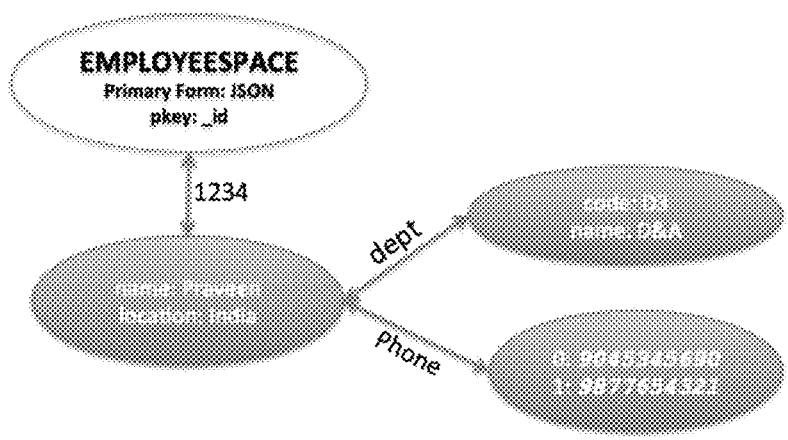
FIG. 10 depicts a set of data constructs to represent a data set corresponding to a JSON format in a single DBMS, according to embodiments.

FIG. 10 depicts a set of data constructs 900 to represent a data set corresponding to a JSON format in a single DBMS, according to embodiments. As described herein, aspects of the disclosure relate to using the set of data constructs 900 to represent data regardless of data format. In embodiments, the set of data constructs 900 may be structured based on the data format in which a set of data is received. Accordingly, aspects of FIG. 10 relate to a set of data constructs 900 to represent data received in a JSON format. In embodiments, a set of sub-documents (e.g., link data) of the set of data may be moved and maintained as a separate node. Data stored in an array may be stored as separate data with values being keyed based on an array index. Nested documents may be similarly processed, with enclosing sub nodes structured as parent nodes. A first attribute (e.g., _id) may be taken as a primary key (e.g., unless another key name is explicitly mentioned). Other methods of structuring the set of data constructs 900 to represent the JSON format are also possible.

Figure 11:
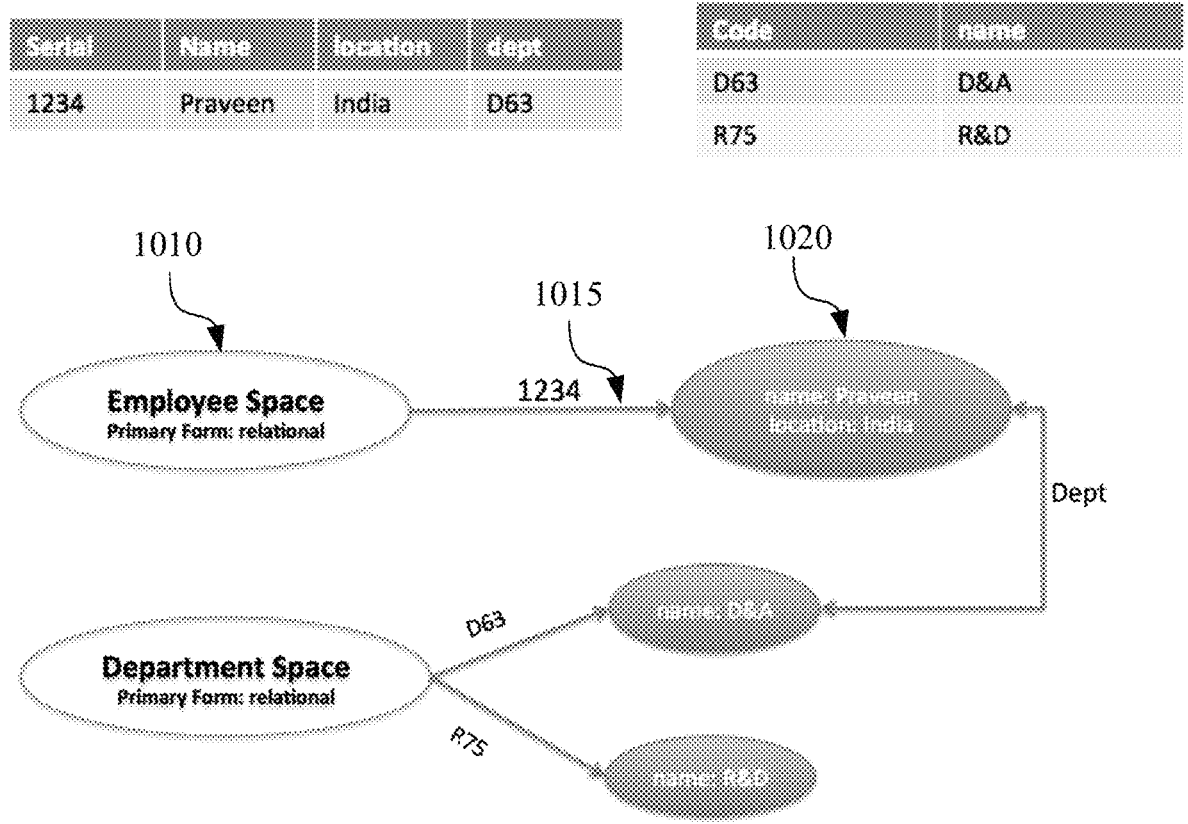
FIG. 11 depicts a set of data constructs to represent a data set corresponding to a first relational format in a single DBMS, according to embodiments.

FIG. 11 depicts a set of data constructs 1000 to represent a data set corresponding to a first relational format in a single DBMS, according to embodiments. As described herein, aspects of the disclosure relate to using the set of data constructs 1000 to represent data regardless of data format. In embodiments, the set of data constructs 1000 may be structured based on the data format in which a set of data is received. Accordingly, aspects of FIG. 11 relate to a set of data constructs 1000 to represent data received in a first relational format. In embodiments, the relation between different spaces will be represented via edges that span between spaces. As an example, edge 1015 may be used to indicate a serial number that connects employee space 1010 with name space 1020. Other methods of structuring the set of data constructs 1000 to represent the first relational format are also possible.

Figure 12:
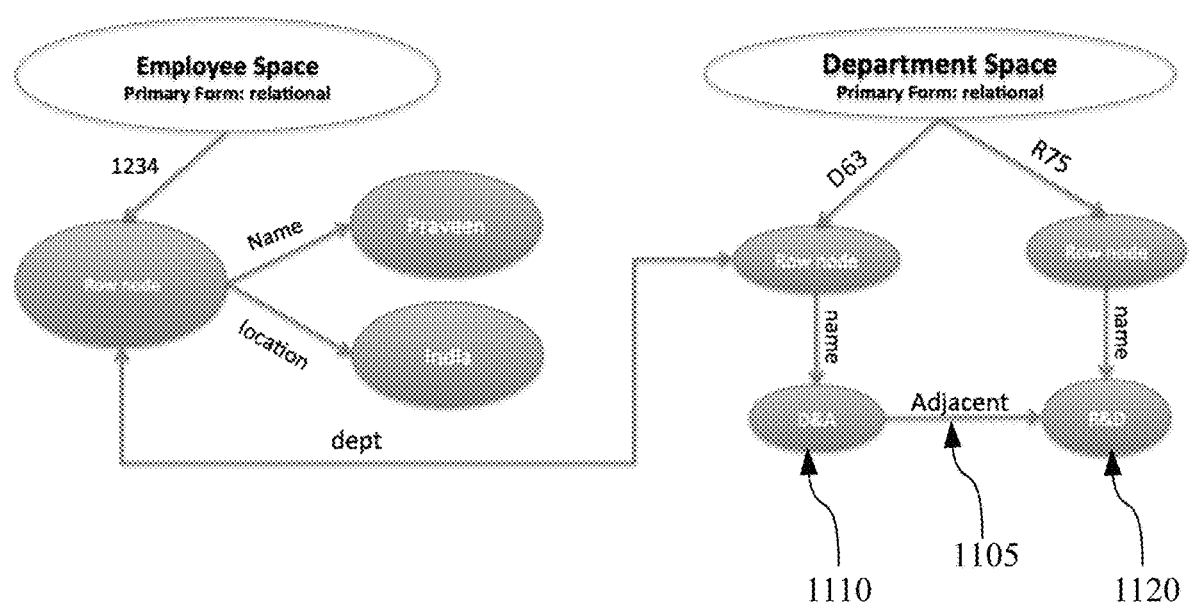
FIG. 12 depicts a set of data constructs to represent a data set corresponding to a second relational format in a single DBMS, according to embodiments.

FIG. 12 depicts a set of data constructs 1100 to represent a data set corresponding to a second relational format in a single DBMS, according to embodiments. As described herein, aspects of the disclosure relate to using the set of data constructs 1100 to represent data regardless of data format. In embodiments, the set of data constructs 1100 may be structured based on the data format in which a set of data is received. Accordingly, aspects of FIG. 12 relate to a set of data constructs 1100 to represent data received in a second relational format. In embodiments, a space may be created for each atomic value detected in the set of received data. A value node may be connected by an edge to another node representing a value for the same column (e.g., to facilitate efficient column traversal). As an example, as shown in FIG. 12, "D&A" space 1110 may be connected to "R&D" space 1120 via edge 1105. Other methods of structuring the set of data constructs 1100 to represent the second relational format are also possible.

Figure 13:
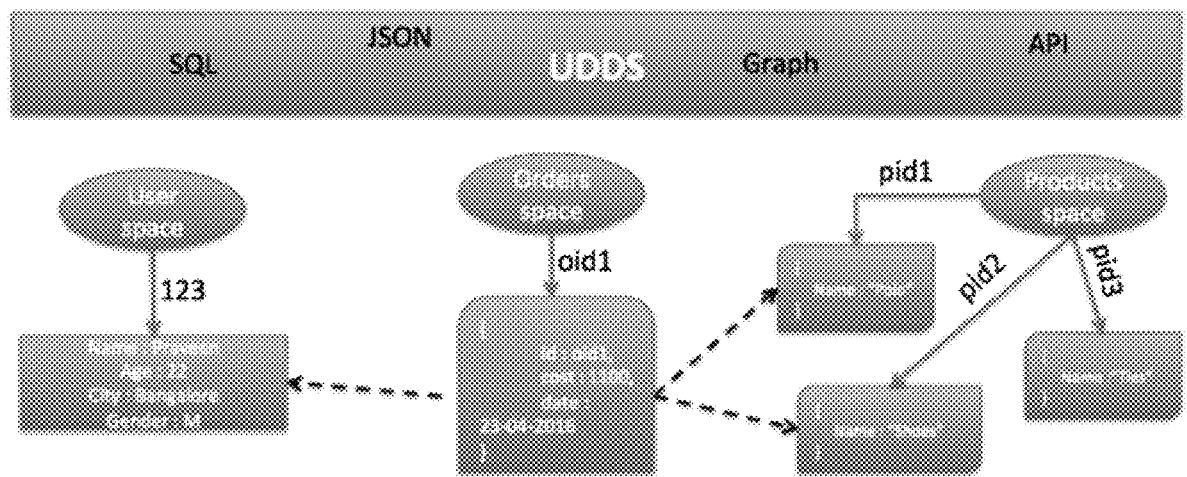
FIG. 13 depicts an infrastructure of a holistic data model, according to embodiments.

FIG. 13 depicts an infrastructure 1200 of a holistic data model, according to embodiments. As described herein, the holistic data model may be configured to interpret and maintain data holistically (e.g., regardless of type or format). The holistic data model may be used to model data using data constructs (e.g., graph structures) to facilitate data flexibility. The holistic data model may be configured to modify (e.g., relax or tighten) transaction behavior based on the transaction mode in which the system is being used. The holistic data model may be configured to switch between operational modes for different data formats (e.g., relational, JSON, graph, key-value). In embodiments, the holistic data model may be configured to perform post-processing of unstructured data (e.g., in documents, emails, images) using natural language processing techniques or image processing techniques to configure the unstructured data as part of the single database (e.g., such that it may be searched for and interfaced with as structured data). Other methods of managing a single database of a single DBMS using the holistic data model are also possible.

Figure 14:
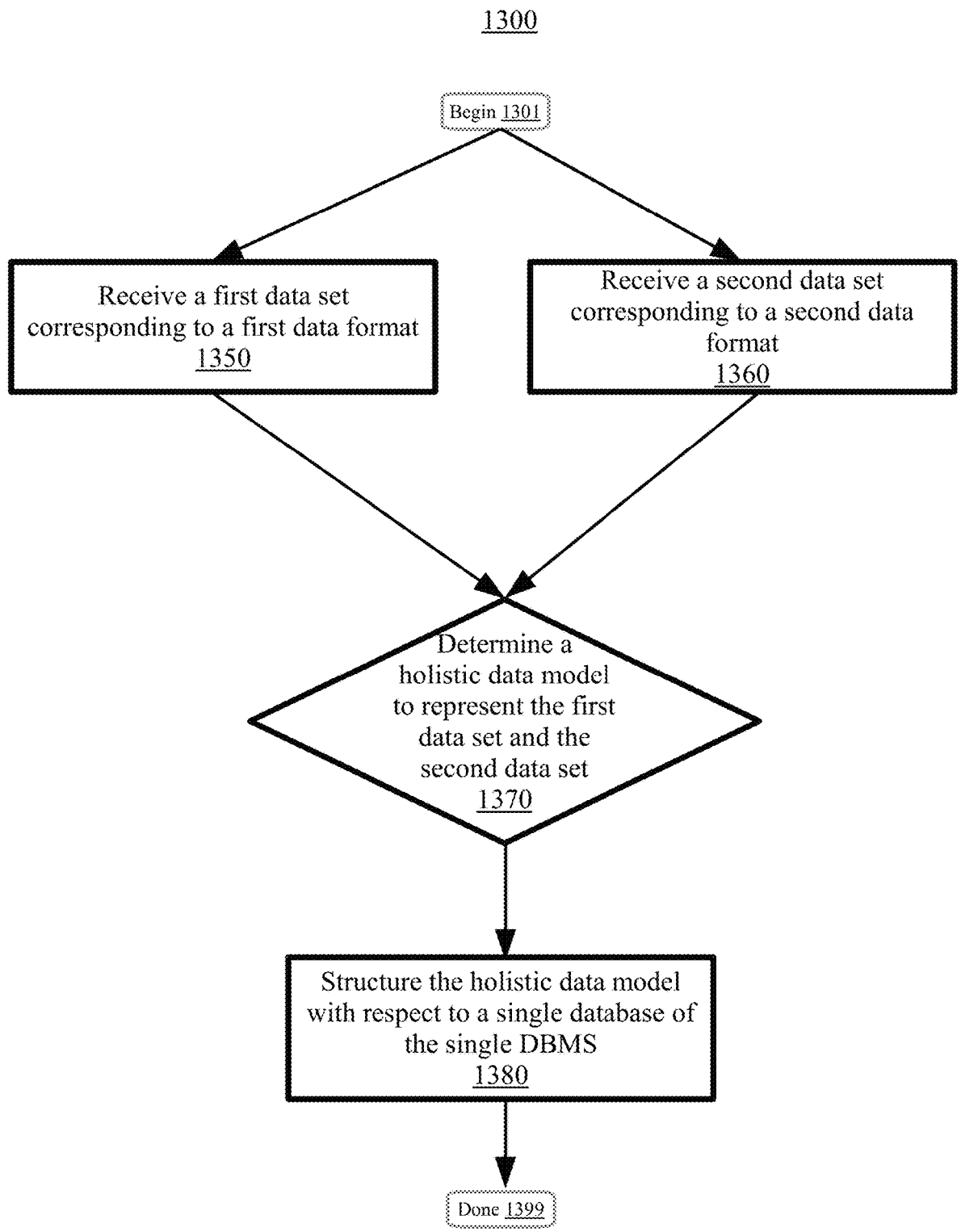
FIG. 14 is a flowchart illustrating a method for managing a single DBMS which interfaces with both a first application program that indicates a first data format and a second application program that indicates a second data format, according to embodiments.

FIG. 14 is a flowchart illustrating a method 1300 for managing a single DBMS which interfaces with both a first application program that indicates a first data format and a second application program that indicates a second data format, according to embodiments. Aspects of FIG. 14 relate to simultaneously receiving a plurality of data sets corresponding to different data formats. The method 1300 may begin at block 1301. As shown in FIG. 14, a first data set corresponding to a first data format may be received at block 1350, and a second data set corresponding to a second data format may be received at block 1360. In embodiments, the first data set corresponding to the first data format and the second data set corresponding to the second format may be receive simultaneously. For instance, in certain embodiments, the single DBMS may be configured to receive the first data set from the first application and the second data set from the second application in parallel, and perform processing operations in a parallel fashion. In embodiments, receiving the first and second data sets may include defining a data set in the holistic data model, and inserting data into the defined data set. As an example, a command of "CREATE SPACE employee (id integer, name varchar)" may be received from an SQL-based application, or a command of "CREATE SPACE employee" may be received from a JSON based application may be received (e.g., columns for the space may be determined based on the nature of the data to be inserted) to create the data set. Subsequent to definition of the space, data may be loaded from an application to the data space based on its data format (e.g., data format of the application). As an example, a command of "INSERT INTO EMPLOYEE (id, name) VALUES (1234, 'John)" may be received from an SQL-based application, or a command of "db.employee.insert ({'id':1234, 'name':'John'})" may be received from a JSON based application to insert data into the created space. In this way, the first and second sets of data may be simultaneously received in a parallel fashion from the first application and the second application, respectively. As described herein, a holistic data model to represent the first data set and the second data set may be determined at block 1370. In embodiments, the holistic data model may be structured with respect to the single database of the single DBMS at block 1380. The method 1300 may conclude at block 1399.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method for managing a single database management system (DBMS) which interfaces with both a first application program that indicates a first data format and a second application program that indicates a second data format, the method comprising:
    receiving, by a DBMS interface engine from the first application program, a first data set corresponding to the first data format;
    receiving, by the DBMS interface engine from the second application program, a second data set corresponding to the second data format, wherein the first data format differs from the second data format;
    extracting, with respect to the first data set corresponding to the first data format, a format-specific data attribute;
    performing, based on the format-specific data attribute with respect to the first data set, a data management action to the first data set for use in the holistic data model with respect to the single database management system;
    compiling, in the single DBMS with respect to an unstructured image format, a set of spaces using an image processing technique from a set of image data within the received first data set or the received second data set;
    constructing, in the single DBMS with respect to the unstructured image format, a set of edges based on a set of key image characteristics between a plurality of respective spaces of the set of spaces;
    determining, by analyzing the first data set and the second data set using the DBMS interface engine, a holistic data model to represent the first data set and the second data set, wherein the holistic data model includes a first data construct based on the first data set and a second data construct based on the second data set, and wherein the holistic data model includes the set of edges;
    structuring, by the DBMS interface engine, the holistic data model with respect to a single database of the single DBMS;
    modeling, using a graph having a set of vertices and the set of edges, the holistic data model with respect to the single database of the single DBMS;
    receiving, by the DBMS interface engine, a first query from the first application program that indicates the first data format;
    receiving, by the DBMS interface engine, a second query from the second application program that indicates the second data format, wherein the first data format differs from the second data format;
    searching, based on the first query from the first application program that indicates the first data format, the holistic data model with respect to the single database system;
    searching, based on the second query from the second application program that indicates the second data format, the holistic data model with respect to the single database system;
    resolving, both based on and in response to searching the single database of the single DBMS, a first valid search result for the first query;
    resolving, both based on and in response to searching the single database of the single DBMS, a second valid search result for the second query;
    providing, by the DBMS interface engine, the first valid search result responsive to the first query from the first application program that indicates the first data format, wherein the first valid search result for the first query is structured according to the first data format; and
    providing, by the DBMS interface engine, the second valid search result responsive to the second query from the second application program that indicates the second data format, wherein the second valid search result for the second query is structured according to the second data format.

2. The method of claim 1, further comprising:
    identifying, by the DBMS interface engine, that the first data format is a JavaScript Object Notation (JSON) format;
    identifying, by the DBMS interface engine, that the second data format is a relational format;
    providing, by the DBMS interface engine, the first valid search result using the JSON format; and providing, by the DBMS interface engine, the second valid search result using the relational format.

3. The method of claim 1, further comprising:
identifying, by the DBMS interface engine, that the first data format is a relational format;
identifying, by the DBMS interface engine, that the second data format is a graph format;
providing, by the DBMS interface engine, the first valid search result using the relational format; and
providing, by the DBMS interface engine, the second valid search result using the graph format.

4. The method of claim 1, further comprising:
identifying, by the DBMS interface engine, that the first data format is a graph format;
identifying, by the DBMS interface engine, that the second data format is a JSON format;
providing, by the DBMS interface engine, the first valid search result using the graph format; and
providing, by the DBMS interface engine, the second valid search result using the JSON format.

5. The method of claim 1, further comprising:
selecting, by the DBMS interface engine, a JSON mode based on at least one data format having a JSON format;
searching, using the JSON mode, the single database of the single DBMS; and
resolving, using the JSON mode, at least one valid JSON search result.

6. The method of claim 1, further comprising:
selecting, by the DBMS interface engine, a relational mode based on at least one data format having a relational format;
searching, using the relational mode, the single database of the single DBMS; and
resolving, using the relational mode, at least one valid relational search result.

7. The method of claim 1, further comprising:
selecting, by the DBMS interface engine, a graph mode based on at least one data format having a graph format;
searching, using the graph mode, the single database of the single DBMS; and
resolving, using the graph mode, at least one valid graph search result.

8. The method of claim 1, further comprising:
detecting that both the first query from the first application program that indicates the first data format and the second query from the second application program that indicates the second data format are from a same application program, wherein the same application program includes both the first application program and the second application program.

9. The method of claim 1, further comprising:
compiling, in the DBMS with respect to a key-value format, a set of spaces which includes information related to a set of typologies;
constructing, in the DBMS with respect to the key-value format, a set of edges based on a set of key values of the key-value format; and
identifying, in the DBMS with respect to the key-value format, a set of keys which indicates a set of values.

10. The method of claim 1, further comprising:
compiling, in the DBMS with respect to a JSON format, a set of spaces which includes information related to a set of typologies;
identifying, in the DBMS with respect to the JSON format, a primary key;
structuring, in the DBMS with respect to the JSON format, a set of separate nodes to include a set of sub-documents; and
structuring, in the DBMS with respect to the JSON format, an array having a set of separate data which includes a set of values which has a key that uses an array index.

11. The method of claim 1, further comprising:
compiling, in the DBMS with respect to a relational format, a set of spaces which includes information related to a set of typologies; and
constructing, in the DBMS with respect to the relational format, a set of edges based on a relationship between a plurality of respective spaces of the set of spaces.

12. The method of claim 1, further comprising:
compiling, in the DBMS with respect to a relational format, a set of spaces which includes a respective node for a respective atomic value; and
constructing, in the DBMS with respect to the relational format, a set of edges based on a relationship between a plurality of respective same-column value nodes of the set of spaces.

13. The method of claim 1, further comprising:
compiling, in the DBMS with respect to an unstructured format, a set of spaces using a natural language processing technique; and
constructing, in the DBMS with respect to the unstructured format, a set of edges based on a set of key natural language characteristics between a plurality of respective spaces of the set of spaces.

14. The method of claim 1, further comprising:
detecting, by the DBMS interface engine, a transaction behavior parameter; and
configuring, by the DBMS interface engine, a transaction mode for which to operate management of the single DBMS.

15. A system for managing a single database management system (DBMS) which interfaces with both a first application program that indicates a first data format and a second application program that indicates a second data format, the system comprising:
a memory having a set of computer readable computer instructions, and
a processor for executing the set of computer readable instructions, the set of computer readable instructions including:
receiving, by a DBMS interface engine from the first application program, a first data set corresponding to the first data format;
receiving, by the DBMS interface engine from the second application program, a second data set corresponding to the second data format, wherein the first data format differs from the second data format;
extracting, with respect to the first data set corresponding to the first data format, a format-specific data attribute;
performing, based on the format-specific data attribute with respect to the first data set, a data management action to the first data set for use in the holistic data model with respect to the single database management system;
compiling, in the single DBMS with respect to an unstructured image format, a set of spaces using an image processing technique from a set of image data within the received first data set or the received second data set;
constructing, in the single DBMS with respect to the unstructured image format, a set of edges based on a set of key image characteristics between a plurality of respective spaces of the set of spaces;

determining, by analyzing the first data set and the second data set using the DBMS interface engine, a holistic data model to represent the first data set and the second data set, wherein the holistic data model includes a first data construct based on the first data set and a second data construct based on the second data set, and wherein the holistic data model includes the set of edges;

structuring, by the DBMS interface engine, the holistic data model with respect to a single database of the single DBMS;

modeling, using a graph having a set of vertices and the set of edges, the holistic data model with respect to the single database of the single DBMS;

receiving, by the DBMS interface engine, a first query from the first application program that indicates the first data format;

receiving, by the DBMS interface engine, a second query from the second application program that indicates the second data format, wherein the first data format differs from the second data format;

searching, based on the first query from the first application program that indicates the first data format, the holistic data model with respect to the single database system;

searching, based on the second query from the second application program that indicates the second data format, the holistic data model with respect to the single database system;

resolving, both based on and in response to searching the single database of the single DBMS, a first valid search result for the first query;

resolving, both based on and in response to searching the single database of the single DBMS, a second valid search result for the second query;

providing, by the DBMS interface engine, the first valid search result responsive to the first query from the first application program that indicates the first data format, wherein the first valid search result for the first query is structured according to the first data format; and providing, by the DBMS interface engine, the second valid search result responsive to the second query from the second application program that indicates the second data format, wherein the second valid search result for the second query is structured according to the second data format.

16. A computer program product managing a single database management system (DBMS) which interfaces with both a first application program that indicates a first data format and a second application program that indicates a second data format, the computer program product comprising a computer readable storage medium having program instructions embodied therewith, wherein the computer readable storage medium is not a transitory signal per se, the program instructions executable by a processor to cause the processor to perform a method comprising:

receiving, by a DBMS interface engine from the first application program, a first data set corresponding to the first data format;

receiving, by the DBMS interface engine from the second application program, a second data set corresponding to the second data format, wherein the first data format differs from the second data format;

extracting, with respect to the first data set corresponding to the first data format, a format-specific data attribute;

performing, based on the format-specific data attribute with respect to the first data set, a data management action to the first data set for use in the holistic data model with respect to the single database management system;

compiling, in the single DBMS with respect to an unstructured image format, a set of spaces using an image processing technique from a set of image data within the received first data set or the received second data set;

constructing, in the single DBMS with respect to the unstructured image format, a set of edges based on a set of key image characteristics between a plurality of respective spaces of the set of spaces;

determining, by analyzing the first data set and the second data set using the DBMS interface engine, a holistic data model to represent the first data set and the second data set, wherein the holistic data model includes a first data construct based on the first data set and a second data construct based on the second data set, and wherein the holistic data model includes the set of edges;

structuring, by the DBMS interface engine, the holistic data model with respect to a single database of the single DBMS;

modeling, using a graph having a set of vertices and the set of edges, the holistic data model with respect to the single database of the single DBMS;

receiving, by the DBMS interface engine, a first query from the first application program that indicates the first data format;

receiving, by the DBMS interface engine, a second query from the second application program that indicates the second data format, wherein the first data format differs from the second data format;

searching, based on the first query from the first application program that indicates the first data format, the holistic data model with respect to the single database system;

searching, based on the second query from the second application program that indicates the second data format, the holistic data model with respect to the single database system;

resolving, both based on and in response to searching the single database of the single DBMS, a first valid search result for the first query;

resolving, both based on and in response to searching the single database of the single DBMS, a second valid search result for the second query;

providing, by the DBMS interface engine, the first valid search result responsive to the first query from the first application program that indicates the first data format, wherein the first valid search result for the first query is structured according to the first data format; and providing, by the DBMS interface engine, the second valid search result responsive to the second query from the second application program that indicates the second data format, wherein the second valid search result for the second query is structured according to the second data format.

* * * * *